United States Patent
Meghani et al.

(10) Patent No.: US 10,013,725 B2
(45) Date of Patent: Jul. 3, 2018

(54) ARCHITECTURE FOR ENERGY MANAGEMENT OF MULTI CUSTOMER MULTI TIME ZONE DISTRIBUTED FACILITIES

(75) Inventors: Ravi Meghani, Bangalore (IN); Rohit Srivastava, Bangalore (IN); Subhasis Mandal, Bangalore (IN); Sudipta Ghosh, Kolkata (IN); Anurag Srivastava, Bangalore (IN)

(73) Assignee: CARRIER CORPORATION, Farmington, CT (US)

( * ) Notice: Subject to any disclaimer, the term of this patent is extended or adjusted under 35 U.S.C. 154(b) by 696 days.

(21) Appl. No.: 13/593,569

(22) Filed: Aug. 24, 2012

(65) Prior Publication Data

US 2013/0261833 A1    Oct. 3, 2013

(30) Foreign Application Priority Data

Apr. 2, 2012 (IN) ............................ 1314/CHE/2012

(51) Int. Cl.
G06F 1/26 (2006.01)
G06Q 50/06 (2012.01)
G06Q 10/10 (2012.01)

(52) U.S. Cl.
CPC ............. *G06Q 50/06* (2013.01); *G06Q 10/10* (2013.01); *Y02P 90/84* (2015.11)

(58) Field of Classification Search
USPC ...................................................... 700/297
See application file for complete search history.

(56) References Cited

U.S. PATENT DOCUMENTS

| | | | |
|---|---|---|---|
| 6,178,362 B1 | 1/2001 | Woolard et al. | |
| 6,553,418 B1 | 4/2003 | Collins et al. | |
| 6,785,592 B1 * | 8/2004 | Smith | G06Q 50/06 700/291 |
| 6,874,691 B1 | 4/2005 | Hildebrand et al. | |
| 7,219,069 B2 | 5/2007 | Fouquet | |
| 7,409,303 B2 | 8/2008 | Yeo et al. | |
| 8,078,330 B2 | 12/2011 | Brickfield et al. | |
| 8,401,709 B2 | 3/2013 | Cherian et al. | |
| 8,457,802 B1 | 6/2013 | Steven et al. | |
| 8,600,556 B2 | 12/2013 | Nesler et al. | |

(Continued)

FOREIGN PATENT DOCUMENTS

| | | |
|---|---|---|
| CN | 103809550 B | 6/2016 |
| CN | 103959322 B | 3/2017 |

*Primary Examiner* — Emilio J Saavedra
(74) *Attorney, Agent, or Firm* — Cantor Colburn LLP

(57) ABSTRACT

A system and method for energy management for multi customer multi time zone distributed facilities are disclosed. In one embodiment, data associated with the energy management of the multi customer distributed facilities located in different time zones is obtained based on associated energy models by a data acquisition/integration layer. Further, the obtained data for energy management of the multi customer distributed facilities is transformed by a data management layer. Furthermore, control commands are generated using the transformed data and associated one or more pre-defined thresholds and set-points by an energy transaction layer. Also, energy of the multi customer distributed facilities is substantially simultaneously managed using the generated control commands by the energy transaction layer.

25 Claims, 30 Drawing Sheets

(56) References Cited

U.S. PATENT DOCUMENTS

| | | | |
|---|---|---|---|
| 8,972,467 B2 | 3/2015 | Heinrich et al. | |
| 9,098,876 B2 | 8/2015 | Steven et al. | |
| 9,135,667 B2 | 9/2015 | Drees et al. | |
| 9,152,610 B2 | 10/2015 | Drees et al. | |
| 9,153,001 B2 | 10/2015 | Walter et al. | |
| 9,171,276 B2 | 10/2015 | Steven et al. | |
| 9,207,698 B2 | 12/2015 | Forbes, Jr. | |
| 9,244,444 B2 | 1/2016 | Carty et al. | |
| 9,292,013 B2 | 3/2016 | Keil et al. | |
| 9,355,069 B2 | 5/2016 | Elbsat et al. | |
| 9,671,843 B2 | 6/2017 | Ellis et al. | |
| 2007/0213881 A1* | 9/2007 | Belady | G05D 23/19 700/300 |
| 2011/0061015 A1* | 3/2011 | Drees | G05B 15/02 715/771 |
| 2011/0087508 A1 | 4/2011 | McConnell et al. | |
| 2011/0213508 A1* | 9/2011 | Mandagere | G06F 1/3203 700/291 |
| 2012/0022700 A1* | 1/2012 | Drees | G05B 15/02 700/276 |
| 2012/0150707 A1* | 6/2012 | Campbell | G06Q 30/04 705/34 |
| 2012/0271472 A1* | 10/2012 | Brunner et al. | 700/295 |
| 2013/0173322 A1 | 7/2013 | Gray | |
| 2014/0278165 A1 | 9/2014 | Wenzel et al. | |
| 2015/0120073 A1 | 4/2015 | Ghosh et al. | |
| 2016/0116513 A1 | 4/2016 | Dutta et al. | |
| 2017/0163039 A1 | 6/2017 | Schwarz et al. | |
| 2017/0343974 A1 | 11/2017 | Baskaran et al. | |

* cited by examiner

FIG. 3

WELCOME, USER  SIGN OUT

USER TO CUSTOMER MAPPING

USER TO SITE MAPPING

USER'S NAME* : [_____] [GO]

ORGANIZATION* : ☐ ORG1  ☐ ORG2  ☐ ORG3

[SAVE]

BROWSER WINDOW

FILE  EDIT  VIEW  FAVORITES  TOOLS  HELP

BACK  SEARCH  FAVORITES

ADDRESS  HTTP://WWW.XYZ.COM  GO  LINKS"

SIGN OUT  ?HELP

INCIDENTS (SP)  [FIND]  [SELECT ACTION ▼]

REPORTED BY  GEMS  AFFECTED PERSON  GEMS
NAME  GEMS USER  NAME  GEMS USER
PHONE  PHONE
E-MAIL  PLATFORM.HELPDESK@ORG2.COM  E-MAIL  PLATFORM.HELPDESK@ORG2.COM

INCIDENT DETAILS

SUMMARY OF THE TICKET  VFD FAULT
EXTENDED SUMMARY
ASSET  C_ORG2xL_EC4xAS_50xAH_50xVFD_50  SITE  ORG2
LOCATION  EC4  CLASSIFICATION  AHU SYSTEM
ASSET SITE  ORG2  T12 3FA  CLASSIFICATION PATH  AVAILABILITY \ AHU
SCA  EC4  EC4  CLASSIFICATION DESCRIPTION  AIR HANDLING UNIT SYSTEM
SUPPLIER ASSET  EC4  INDICATED PRIORITY
REPORTED PRIORITY  4
IMPACT  4  LOW
URGENCY  4  LOW
INTERNAL PRIORITY  4  LOW

DATES

LOCATION TIME ZONE DATES

THE BELOW DATES WILL BE DISPLAYED BASED ON ASSET'S LOCATION TIME ZONE

PROFILE TIME ZONE  ASIA/CALCUTTA  (GMT+5.5 DST/N) CALCUTTA,CHENNAI, MUMBAI  LOCATION TIME ZONE  ASIA/CALCUTTA  (GMT+5.5 DST/N) CALCUTTA,CHENNAI, MUMBAI

REPORTED DATE  01/06/2011 00:57:00  REPORTED DATE  01/06/2011 00:57:00
AFFECTED DATE  01/06/2011 00:57:00  AFFECTED DATE  01/06/2011 00:57:00
CREATION DATE  01/06/2011 01:01:58  CREATION DATE  01/06/2011 01:01:58
ACTUAL START  01/06/2011 09:18:31  ACTUAL START  01/06/2011 09:18:31
ACTUAL FINISH  01/06/2011 11:44:59  ACTUAL FINISH  01/06/2011 11:44:59

DONE  INTERNET

START

500

| | LOCATION INCIDENT REPORT | | | | | | |
|---|---|---|---|---|---|---|---|
| ORGANIZATION2 | | | | | | | |

ORGANIZATION : ORG1
ORGANIZATION DESCRIPTION : ORGANIZATION1
LOCATION : 102335
LOCATION DESCRIPTION : X1
START DATE : NOV 1, 2011
END DATE : JAN 1, 2012
TIME ZONE : ASIA / CALCUTTA

INCIDENT DETAILS :
NUMBER OF INCIDENTS: 256
NUMBER OF INCIDENTS CLOSED: 2

| TICKET ID | DESCRIPTION | ASSET | ASSET DESCRIPTION | STATUS | PLATFORM LST | PLATFORM LET | ASSET LST | ASSET LET |
|---|---|---|---|---|---|---|---|---|
| 266626 | TESTING CR1908 | C_ORG1xL_102335xAS_02 | FIRST FLOOR WORKSTATION AHU SYSTEM | QUEUED | NOV 08, 2011 1:26 PM | | 08/11/2011 13:26:20 | |
| 266627 | DATA CENTER PAC UNIT ALARM | C_ORG1xL_102335xPS_02xPC_01 | DATA CENTER AREA SCA'S PAC | QUEUED | NOV 11, 2011 8:35 PM | | 11/11/2011 20:35:00 | |

602
604

600

BROWSER WINDOW

FILE  EDIT  VIEW  FAVORITES  TOOLS  HELP

BACK  SEARCH ☆ FAVORITES

ADDRESS  HTTP://WWW.XYZ.COM  GO

VIEW:  WELCOME  HELP | LOGOUT

| CUSTOMER | ORG3_AEL | ORG2_AEL | --- SELECTION ACTION --- |

ORG2_AEL

ACTIVE EVENT LIST

| | ORG2 | | EVENT SUMMARY | |

| ORG ID | NODE | SUMMARY | FIRST OCCURENCE | LAST OCCURENCE | SITE ID |
|---|---|---|---|---|---|
| ORG2 | C_AC1xL_S001xEC_01 | POWER SUPPLY IS OFF | 8/4/2011 5:42:46 PM IST | 20/5/2011 4:10:00 PM IST | ORG3 |
| ORG2 | C_ORG1xL_02335xSS_04xSAC_02 | SIM DISPATCH ROOM AC2 COMMAND MISMATCH | 29/3/2011 5:40:48 PM IST | 12/4/2011 1:36:00 PM IST | ORG1 |
| ORG2 | C_AC1xL_S001xAS_02xAH_02 | AHU02 SUPPLY FAN MISMATCH ALARM | 19/3/2011 12:01:34 AM IST | 19/3/2011 12:01:34 AM IST | ORG3 |
| ORG2 | C_AC1xL_S001xEC_01 | PEAK DEMAND EXCEEDED | 9/4/2011 1:41:32 PM IST | 9/4/2011 1:41:32 PM IST | ORG3 |
| ORG2 | C_AC1xL_S001xEC_01 | PEAK DEMAND EXCEEDED | 9/4/2011 1:11:07 PM IST | 9/4/2011 1:11:07 PM IST | ORG3 |
| ORG2 | C_AC1xL_S001xEC_01 | PEAK DEMAND EXCEEDED | 9/4/2011 12:39:00 PM IST | 9/4/2011 12:39:00 PM IST | ORG3 |
| ORG2 | C_AC1xL_S001xEC_01 | PEAK DEMAND EXCEEDED | 9/4/2011 12:20:31 PM IST | 9/4/2011 12:20:31 PM IST | ORG3 |
| ORG2 | C_AC1xL_S001xEC_01 | PEAK DEMAND EXCEEDED | 9/4/2011 3:28:14 PM IST | 9/4/2011 3:28:14 PM IST | ORG3 |
| ORG2 | C_AC1xL_S001xEC_01 | PEAK DEMAND EXCEEDED | 9/4/2011 3:22:08 PM IST | 9/4/2011 3:22:08 PM IST | ORG3 |
| ORG2 | C_AC1xL_S001xEC_01 | PEAK DEMAND EXCEEDED | 9/4/2011 2:53:05 PM IST | 9/4/2011 2:53:05 PM IST | ORG3 |
| ORG2 | C_AC1xL_S001xEC_01 | PEAK DEMAND EXCEEDED | 9/4/2011 2:19:43 PM IST | 9/4/2011 2:19:43 PM IST | ORG3 |

| WARNING 58 | MINOR 4 | MAJOR 37 | CRITICAL 74 | ALL EVENTS (173) |

DONE  INTERNET

START

FIG. 17B  1700B

ASSET (SP)

GO TO PROFILE SIGN OUT ?HELP

| ▽ | FIND | | | SELECT ACTION | ▽ | |
|---|---|---|---|---|---|---|
| LIST | ASSET | SPARE PARTS | SAFETY | METERS | | SPECIFICATIONS |

ASSET [C_ORG2xL_PDC2xAHUPNL_01] [PDC2 CAFETERIA FF(FUSION)] SITE [ORG2] ATTACHMENTS 📎

STATUS [OPERATING] TYPE [ ] MOVED? ☐

DETAILS

| | | | |
|---|---|---|---|
| PARENT | [ ] | CALENDAR | ☐ |
| MAINTAIN HIERARCHY? | ☐ | SHIFT | ☐ |
| LOCATION | [PDC2] | PRIORITY | ☐ |
| BIN | | SERIAL # | ☐ |
| ROTATING ITEM | | FAILURE CLASS | ☐ |
| CONDITION CODE | | ITEM TYPE | ☐ |
| METER GROUP | | TOOL RATE | ☐ |
| USAGE | | | |
| PRIMARY CUSTOMER | [ORG2] [ORGANIZATION2] | CUSTOMER CHARGE ACCOUNT | |
| | | CUSTOMER COST CENTER | |

PURCHASE INFORMATION     COST

| | | | |
|---|---|---|---|
| VENDOR | [ ] | TOTAL COST | [0.00] |
| MANUFACTURER | [ ] | YTD COST | [0.00] |
| INSTALLATION DATE | [ ] | BUDGETED | [0.00] |
| PURCHASE PRICE | [0.00] | INVENTORY | [0.00] |
| REPLACEMENT COST | [0.00] | | |
| PO | [ ] | | |

DOWNTIME     MODIFIED

ASSET UP? ☑

LAST CHANGED DATE [05/12/2011 13:27:17]    CHANGED BY [AMOS USER 1]

TOTAL DOWNTIME [0.00]    CHANGED DATE [05/12/2011 13:27:17]

THERMAL ANALYSIS FOR SCA

ORGANIZATION: ORG4
ORGANIZATION DESCRIPTION: ORGANISATION 4
LOCATION: 0540
LOCATION DESCRIPTION: COON RAPIDS(0540) STORE,ORG4
MSAUID: C_ORG4XL_0540XMA_0540
MSA DESCRIPTION: COON RAPIDS(0540) STORE
SCATYPE: SALES AREA
SCA UID: C_ORG4XL_0540XSA_SALES
SCA DESCRIPTION: SALES AREA
START DATE: MAR 1,2012 10:00 AM
END DATE: MAR 13,2012 10:30 PM
AVERAGE TEMPERATURE: 70 DEG F
TIME ZONE: AMERICA/CHICAGO

NOTE: ALL TEMPERATURE VALUES SHOW IN THIS TABLE ARE IN DEG F

| DATE: | OC% | UC% | NORMAL% | OH% | UH% | DAILY AVERAGE |
|---|---|---|---|---|---|---|
| MAR 1, 2012 | 0 | 0 | 40.07 | 57.91 | 2.02 | 71 |
| MAR 2, 2012 | 0 | 0 | 34.52 | 63.7 | 1.78 | 71 |
| MAR 3, 2012 | 0 | 0 | 49.48 | 48.44 | 2.08 | 71 |
| MAR 4, 2012 | 0 | 0 | 45.02 | 48.71 | 6.27 | 70 |
| MAR 5, 2012 | 0 | 0 | 50.51 | 45.48 | 4.01 | 71 |
| MAR 6, 2012 | 0 | 0 | 37.5 | 59.38 | 3.12 | 71 |
| MAR 7, 2012 | 0 | 0 | 36.79 | 63.21 | 0 | 70 |
| MAR 8, 2012 | 0 | 0 | 69.8 | 29.51 | .69 | 70 |
| MAR 9, 2012 | 0 | 0 | 14.1 | 50.67 | 0 | 71 |
| MAR 10, 2012 | 35.23 | 0 | 70.88 | 23.04 | .43 | 71 |
| MAR 11, 2012 | 5.65 | 0 | 77.03 | 18.92 | 0 | 72 |
| MAR 12, 2012 | 4.05 | 0 | 68.84 | 0 | 0 | 72 |
|  | 31.16 |  |  |  |  |  |

UC: UNDERCOOLING  OH: OVERHEATING  UH: UNDERHEATING  N: NORMAL

ARCHITECTURE FOR ENERGY MANAGEMENT OF MULTI CUSTOMER MULTI TIME ZONE DISTRIBUTED FACILITIES

CROSS-REFERENCE TO RELATED APPLICATIONS

Benefit is claimed under 35 U.S.C. 119(a)-(d) to Foreign Application Serial No. 1314/CHE/2012, filed in INDIA entitled "ARCHITECTURE FOR ENERGY MANAGEMENT OF MULTI CUSTOMER MULTI TIME ZONE DISTRIBUTED FACILITIES" by Wipro Limited, filed on Apr. 2, 2012, which is herein incorporated in its entirety by reference for all purposes.

TECHNICAL FIELD

Embodiments of the present subject matter relate to energy management. More particularly, embodiments of the present subject matter relate to energy management of multi customer multi time zone distributed facilities.

BACKGROUND

According to the international energy agency (IEA)-world energy outlook report 2010, demand for energy in the world is expected to increase drastically in coming few decades. Whereas, sources and supply of conventional energy like electricity from utility companies is going to be limited. This may lead to a huge supply-demand gap in energy. Also, the energy needs to be efficiently used to reduce carbon footprint. One of the major challenges faced by large consumers of energy, for example, a distributed facility or a process plant is to reduce energy consumption without compromising on the quality of operating conditions and quality of services. Under these circumstances environmental sustainability has been drawing a greater attention.

A plethora of advanced technologies are being implemented in order to optimize the rate of consumption of energy. For example, in geographic locations where the climate varies significantly, energy consumption control in accordance with operating conditions becomes even more relevant.

Further, regulatory policies governing energy supply & consumption also vary from country-to-country and even within a single country. Furthermore, different organizations owning the distributed facilities or process plants set forth policies related to operating conditions and energy consumptions as desired by them. The maintenance of required operating conditions in the distributed facility or process plant becomes even more complicated and challenging, with consumers opting for a combination of multiple sources of conventional and unconventional energy supply in a dynamic way. Moreover, cost and quality of energy consumed from different sources may also be significantly different can further add to the complexity to maintenance of required operating conditions.

Moreover, in any system, optimization of energy consumption and related controls is greatly influenced by granularity of measurement and metering of consumption. Since granularity and extent of metering is limited by practical constraints like constituency of metered area as recognized by the energy supplier and cost benefit analysis of own metering in the distributed facility, accurate and granular of measurement of energy consumption at an individual device level remains a myth.

In a typical distributed facility (e.g., a multi-facility), there can be different classes/types of devices performing different functions. Some of these devices directly contribute to environment control and some indirectly. Devices belonging to a device group performing same or similar functions may further have different characteristics. However, typically facility management systems implement individual level control of devices or a group of devices for such purpose. This may make the process of environment control less effective and less efficient because of lack of traceable and lesser controllability, to maintain desired operating conditions.

Existing techniques do not provide an intelligent and comprehensive energy management solutions for optimization of energy consumption and control of such complex aggregation of diverse devices in multi customer multi time zone distributed facilities, such as process plants, office spaces, retail outlets and the like for achieving desired operating conditions within the given set of policies.

SUMMARY

A system and method for energy management of multi customer distributed facilities located in different time zones are disclosed. According to one aspect of the present subject matter, associated energy models of the multi customer distributed facilities are formed based on parameters, such as facility characteristics, device characteristics, service characteristics, customer needs, available energy sources, customer policies, regulatory policies and the like using a user interface layer. Further, data associated with energy management of the multi customer distributed facilities is obtained based on the associated energy models by a data acquisition/integration layer.

Furthermore, the obtained data for energy management of the multi customer distributed facilities is transformed by a data management layer. In addition, the transformed data is processed by an energy transaction layer to obtain energy efficiency improvement features, such as consumption profiling by an operation mode, thermal profiling by service consumption, normalization of data obtained from multiple time zones, consumption data profiling by service type using virtual meters and model information and intelligent estimation techniques for missing consumption information, thermal profiling of service consumption areas (SCAs), eco-mode profiling, savings estimation, asset utilization and capacity profiling, data validation based on customer and region characteristics, correlated validation, correlated data, device characteristic validation, industry, past performance, climate, policies, load conditions, and service for validation, device, area and service chain based event/ticket enrichment of dependent devices, services, areas (a SCA, a metered service area (MSA) and a site) and the like.

Also, one or more predefined thresholds and set-points are updated by an energy efficiency management layer. Moreover, statistical and root-cause analysis is performed on the operational data by a framework and utilities layer to obtain energy optimization data upon receiving a request from the energy efficiency management layer. Further, energy management information is updated using the energy optimization data by the energy efficiency management layer.

Furthermore, control commands are generated using the processed data, associated one or more pre-defined thresholds and set-points, and the energy management information by the energy transaction layer. In addition, energy of the multi customer distributed facilities is substantially simultaneously managed using the generated control commands by the energy transaction layer. Also, performance, compliance and efficacy of the system are intelligently reported to the multi customer distributed facilities by the framework and utilities layer via the user interface layer.

According to another aspect of the present subject matter, an energy management system (EMS) includes a processor, memory, and an energy management engine residing in the memory. Further, the energy management engine includes the data acquisition/integration layer, the data management layer, the energy transaction layer, the energy efficiency management layer, the user interface layer, and the framework and utilities layer.

In one embodiment, the associated energy models of the multi customer distributed facilities are formed based on parameters, such as facility characteristics, device characteristics, service characteristics, customer needs, available energy sources, customer policies, regulatory policies and the like using the user interface layer. Further, the data acquisition/integration layer data obtains data associated with energy management of the multi customer distributed facilities based on the formed associated energy models.

Furthermore, the energy transaction layer process the transformed data to obtain energy efficiency improvement features, such as consumption profiling by an operation mode, thermal profiling by service consumption, normalization of data obtained from multiple time zones, consumption data profiling by service type using virtual meters and model information and intelligent estimation techniques for missing consumption information, thermal profiling of SCAs, eco-mode profiling, savings estimation, asset utilization and capacity profiling, data validation based on customer and region characteristics, correlated validation, correlated data, device characteristic validation, industry, past performance, climate, policies, load conditions, and service for validation, device, area and service chain based event/ticket enrichment of dependent devices, services, areas and the like.

In addition, the energy efficiency management layer updates the one or more predefined thresholds and set-points. Moreover, the framework and utilities layer performs statistical and root-cause analysis on the operational data to obtain energy optimization data upon receiving the request from the energy efficiency management layer. Also, the energy efficiency management layer updates energy management information using the energy optimization data.

Further, the energy transaction layer generates control commands using the processed data, associated one or more pre-defined thresholds and set-points, and the updated energy management information. Furthermore, the energy transaction layer substantially simultaneously manages energy of the multi customer distributed facilities using the generated control commands. In addition, the framework and utilities layer intelligently reports the performance, compliance and efficacy of the system to the multi customer distributed facilities via the user interface layer.

According to yet another aspect of the present subject matter, a non-transitory computer-readable storage medium for energy management of the multi customer distributed facilities located in different time zones, having instructions that, when executed by a computing device causes the computing device to perform the method described above.

The system and method disclosed herein may be implemented in any means for achieving various aspects, and other features will be apparent from the accompanying drawings and from the detailed description that follows.

BRIEF DESCRIPTION OF THE DRAWINGS

Various embodiments are described herein with reference to the drawings, wherein:

FIG. 3 is a screen illustrating access control of a user to multiple customers, according to one embodiment;

FIG. 4 is a screen illustrating access control of the user to a customer site, according to one embodiment;

FIG. 5 is a screen that illustrates ticket screen extension, according to one embodiment;

FIG. 6 is a screen illustrating an incident report, according to one embodiment;

FIG. 8 is a screen illustrating various assets belonging to the asset system, according to one embodiment;

FIG. 10 is a screen illustrating statistical and root-cause analysis, according to one embodiment;

FIGS. 17A-B are screens illustrating event management, according to one embodiment;

FIGS. 18 and 19 are screens illustrating asset management, according to one embodiment;

FIG. 23 is a screen illustrating thermal profiling, according to one embodiment;

FIGS. 26-28 are screens illustrating virtual metering, according to one embodiment.

The drawings described herein are for illustration purposes only and are not intended to limit the scope of the present disclosure in any way.

DETAILED DESCRIPTION

Architecture for energy management of multi customer multi time zone distributed facilities is disclosed. In the following detailed description of the embodiments of the present subject matter, references are made to the accompanying drawings that form a part hereof, and in which is shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The term "energy management" refers to service and consumption management of infrastructure associated with energy across one or more distributed facilities located in different time zones.

The present architecture allows scalability of the energy management from a decentralized energy management to centralized energy management environments.

Figure 1:
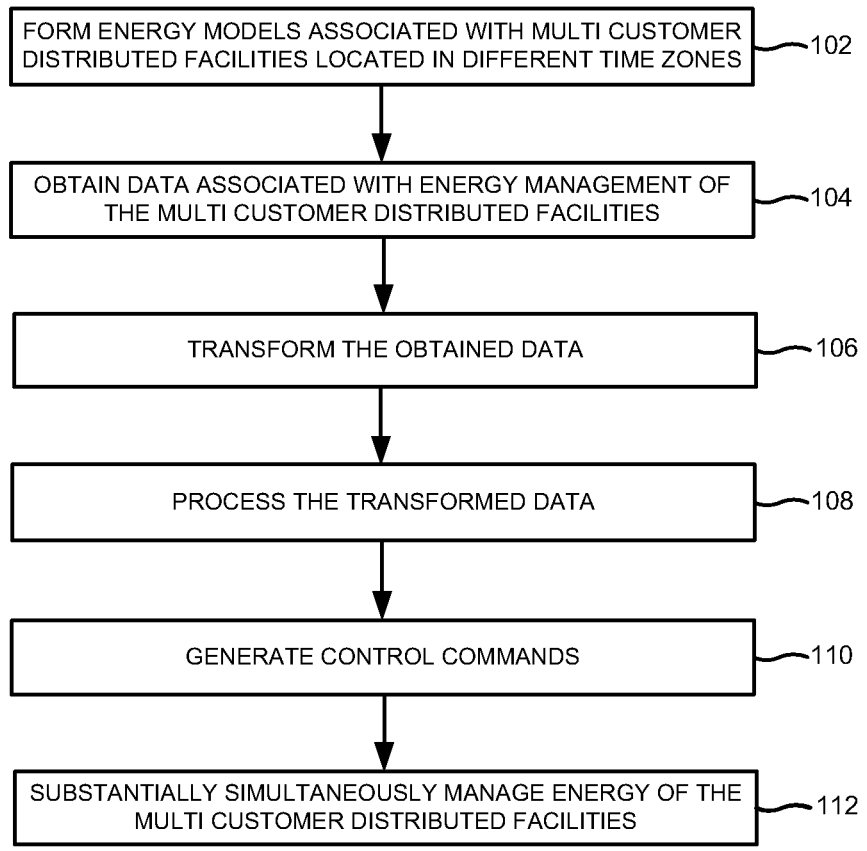
FIG. 1 illustrates a flowchart of a computer implemented method for energy management of multi customer distributed facilities located in different time zones, according to one embodiment.

FIG. 1 illustrates a flowchart 100 of a computer implemented method for energy management of multi customer distributed facilities located in different time zones, according to one embodiment. At block 102, associated energy models of the multi customer distributed facilities are formed based on parameters, such as facility characteristics, device characteristics, service characteristics, customer needs, available energy sources, customer policies, regulatory policies and the like using a user interface layer. The multi customer multi time zone distributed facilities are explained with reference to screens 300, 400, 500 and 600 shown in FIGS. 3, 4, 5, and 6, respectively. The outputs of energy model are explained with reference to screens 700 and 800 shown in FIGS. 7 and 8, respectively. At block 104, data associated with energy management of the multi customer distributed facilities is obtained based on the associated energy models by a data acquisition/integration layer. Exemplary data includes automated meter data, emissions data, digital invoice data, device and sensor data, enterprise resource planning (ERP) data, weather data, emergency alert data, service desk data and the like.

At block 106, the obtained data for energy management of the multi customer distributed facilities is transformed by a data management layer. In one embodiment, the obtained data is mediated by a data mediation module in the data management layer. Further, the mediated data is normalized by a data normalization module in the data management layer. Furthermore, the normalized data is validated by a data validation module in the data management layer. At block 108, the transformed data is processed by an energy transaction layer to obtain energy efficiency improvement features, such as consumption profiling by an operation mode, thermal profiling by service consumption, normalization of data obtained from multiple time zones, consumption data profiling by service type using virtual meters and model information and intelligent estimation techniques for missing consumption information, thermal profiling of service consumption areas (SCAs), eco-mode profiling, savings estimation, asset utilization and capacity profiling, data validation based on customer and region characteristics, correlated validation, correlated data, device characteristic validation, industry, past performance, climate, policies, load conditions, and service for validation, device, area and service chain based event/ticket enrichment of dependent devices, services, areas (a SCA, a metered service area (MSA) and a site) and the like. The eco-mode profiling is explained with reference to a screen 2200 shown in FIG. 22. The thermal profiling is explained with reference to a screen 2300 shown in FIG. 23. The asset utilization and capacity profiling is explained with reference to a screen 2400 shown in FIG. 24. The consumption profiling by the operation mode is explained with reference to a screen 2500 shown in FIG. 25. The virtual metering is explained with reference to screens 2600, 2700 and 2800 shown in FIGS. 26-28, respectively.

At block 110, control commands are generated using the processed data and associated one or more pre-defined thresholds and set-points by the energy transaction layer. In one exemplary implementation, control commands are generated based on the processed data, associated one or more pre-defined thresholds and set-points and dynamic decisions obtained from the energy efficiency management layer by the energy transaction layer. Exemplary control commands include thermal control, consumption control, operational modes control, utilization control, demand control, eco-mode control, energy source control, carbon emission control, performance monitoring control and the like. The commands for thermal control are explained in Appendix A.

In one embodiment, the one or more predefined thresholds and set-points are dynamically updated based on operational data obtained from the energy transaction layer by an energy efficiency management layer. The commands for threshold adjustment based on operation data is explained in Appendix A. In another embodiment, the one or more predefined thresholds and set-points are updated based on an energy knowledge base in a framework and utilities layer by the energy efficiency management layer. Further, statistical and root-cause analysis is performed on the operational data by the framework and utilities layer to obtain energy optimization data upon receiving a request from the energy efficiency management layer. The statistical and root-cause analysis is explained with reference to screen 1000 shown in FIG. 10. For example, the energy optimization includes output of historical data analysis that provides deviation and information about what to optimize. The energy management information is then updated using the energy optimization data by the energy efficiency management layer. For example, energy management information includes information regarding what is to be done to optimize energy. Furthermore, control commands are generated using the processed data, the associated updated one or more pre-defined thresholds and set-points, and the energy management information by the energy transaction layer.

At block 112, energy of the multi customer distributed facilities is substantially simultaneously managed using the generated control commands by the energy transaction layer. For example, managing the energy includes event management, asset management, billing, invoicing and cost optimization management and the like. The event management is explained with reference to screens 1700A and 1700B shown in FIGS. 17A-B. The asset management is explained with reference to screens 1800 and 1900 shown in FIGS. 18 and 19, respectively. The billing management is explained with reference to screen 2000 shown in FIG. 20. The invoicing and cost management is explained with reference to screen 2100 shown in FIG. 21. Further, performance, compliance and efficacy of the system are intelligently reported to the multi customer distributed facilities by the framework and utilities layer via the user interface layer. The performance of the system is explained with reference to screen 1200 shown in FIG. 12. The efficiency of the system is explained with reference to screen 1400 shown in FIG. 14.

Figure 2:
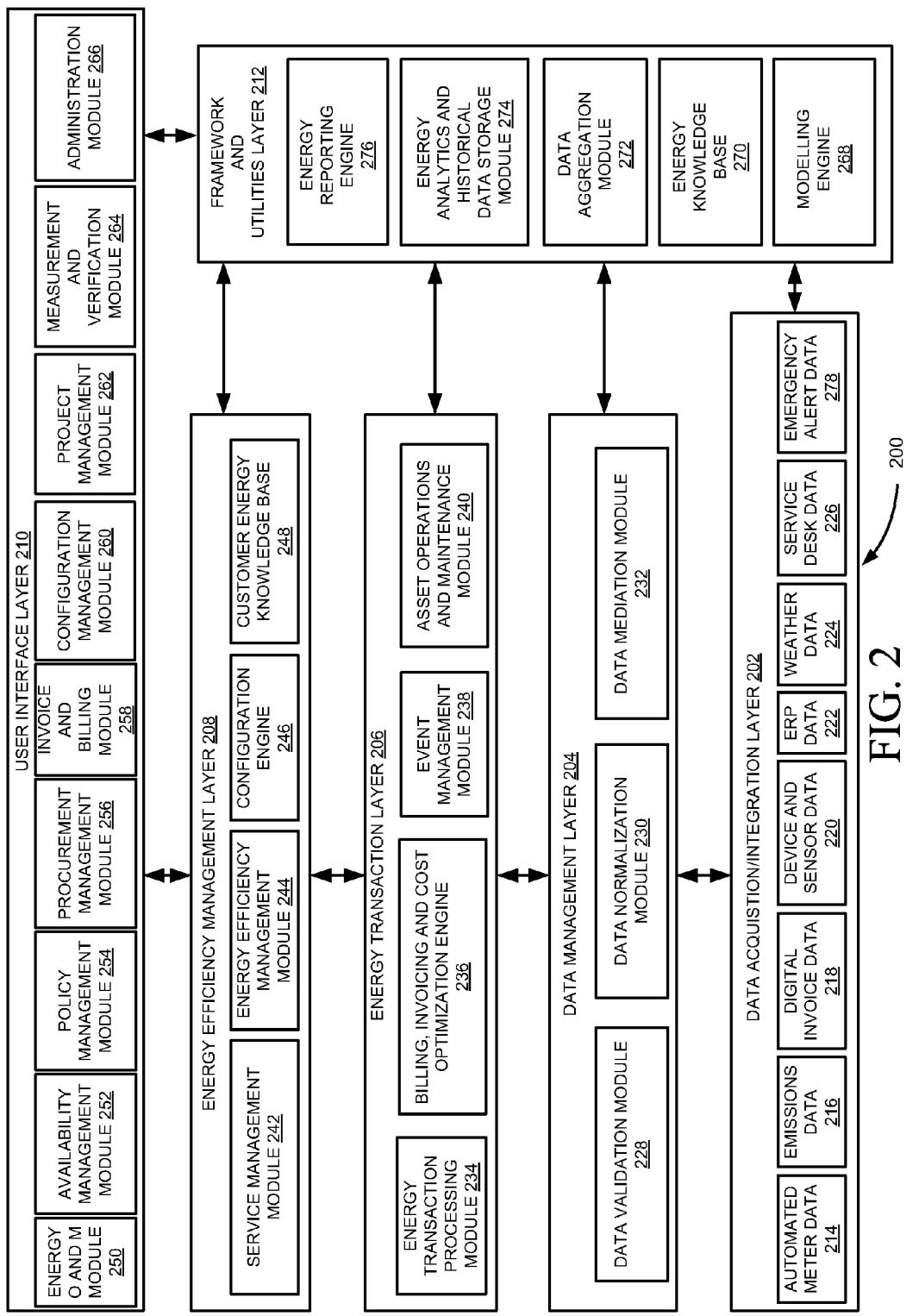
FIG. 2 illustrates a functional energy management architecture for energy management of multi customer distributed facilities located in different time zones, such as the one shown in FIG. 1, according to one embodiment.

Referring now to FIG. 2, which illustrates functional energy management architecture 200 for energy management of the multi customer distributed facilities located in different time zones, such as the one shown in FIG. 1, according to one embodiment. As shown in FIG. 2, the functional energy management architecture 200 includes a data acquisition/integration layer 202, a data management layer 204, an energy transaction layer 206, an energy efficiency management layer 208, a user interface layer 210, and a framework and utilities layer 212. Further, the data acquisition/integration layer 202 includes automated meter data 214, emissions data 216, digital invoice data 218, device and sensor data 220, ERP data 222, weather data 224, service desk data 226 and emergency alert data 278. Furthermore, the data management layer 204 includes a data validation module 228, a data normalization module 230, and a data mediation module 232. In addition, the energy transaction layer 206 includes an energy transaction processing module 234, a billing, invoicing and cost optimization engine 236, an event management module 238, and an asset operations and maintenance (O and M) module 240. Moreover, the energy efficiency management layer 208 includes a service management module 242, an energy efficiency management module 244, a configuration engine 246, and a customer energy knowledge base 248. Also, the user interface layer 210 includes a energy O and M module 250, an availability management module 252, a policy management module 254, a procurement management module 256, an invoice and billing module 258, a configuration management module 260, a project management module 262, a measurement and verification module 264, and an administration module 266. Further, the framework and utilities layer 212 includes a modeling engine 268, an energy knowledge base 270, a data aggregation module 272, an energy analytics and historical data storage module 274, and an energy reporting engine 276.

Furthermore, the data acquisition/integration layer 202 is communicatively coupled to the data management layer 204. In addition, the data management layer 204 is communicatively coupled to the energy transaction layer 206. Moreover, the energy transaction layer 206 is communicatively coupled to the energy efficiency management layer 208. Also, the energy efficiency management layer 208 is communicatively coupled to the user interface layer 210. Further, the framework and utilities layer 212 is communicatively coupled to the data acquisition/integration layer 202, the data management layer 204, the energy transaction layer 206, the energy efficiency management layer 208, and the user interface layer 210.

In operation, the modeling engine 268 in the framework and utilities layer 212 forms associated energy models of the multi customer distributed facilities based on parameters, such as facility characteristics, device characteristics, service characteristics, customer needs, available energy sources, customer policies, regulatory policies and the like using the user interface layer 210. Further, the data acquisition/integration layer 202 obtains data associated with energy management of the multi customer distributed facilities based on the formed associated energy models. For example, the data acquisition/integration layer 202 obtains automated meter data 214, emissions data 216, digital invoice data 218, device and sensor data 220, ERP data 222, weather data 224, service desk data 226 and emergency alert data 278 associated with energy management of the multi customer distributed facilities based on the formed associated energy models.

Furthermore, the data management layer 204 transforms the obtained data for energy management of the multi customer distributed facilities located in multi time zones. In one exemplary implementation, the data management layer 204 transforms the obtained data and enables data correlation for further processing. Further, the data management layer 204 encapsulates and abstracts the functional energy management architecture 200 from complexity of multiple protocols, data coming in various formats, unclean and incorrect data. In one embodiment, the data mediation module 232 mediates the obtained data. The data normalization module 230 then normalizes the mediated data. The data validation module 228 then validates the normalized data.

For example, the data mediation module 232 converts data format and naming from one set of protocols to another set of protocols to form a uniform logic, for example, from building automation control network (BacNET) to simple network management protocol user identities (SNMP UIDs). The data normalization module 230 normalizes the data for further processing as required. For example, the data normalization module 230 converts temperature data from deg f. to deg c. The data validation module 228 performs syntactical and semantic data validation on the obtained data. For example, the data validation module 228 can detect errors, such as Delhi temperature sensor showing −5 deg which is not a valid value.

In one embodiment, the data management layer 204 manages data associated with multiple meters and models the data for total consumption and service breakup consumption of MSAs. Further, the data management layer 204 automatically takes care of multiple meter issues like meter resets, meter data loss, meter data delay and the like and provides feedback regarding the issues on a real time basis. The data management layer 204 then corrects the data based on multiple estimation techniques. Particularly, the data management layer 204 provides consumption breakup with a granularity of hourly, daily and monthly levels that allows for calculation and segregation of consumption between services using asset status data instead of the meter data in a situation where a lower level of accuracy is acceptable.

In addition, the energy transaction layer 206 process the transformed data to obtain energy efficiency improvement features, such as consumption profiling by an operation mode, thermal profiling by service consumption, normalization of data obtained from multiple time zones, consumption data profiling by service type using virtual meters and model information and intelligent estimation techniques for missing consumption information, thermal profiling of SCAs, eco-mode profiling, savings estimation, asset utilization and capacity profiling, data validation based on customer and region characteristics, correlated validation, correlated data, device characteristic validation, industry, past performance, climate, policies, load conditions, and service for validation, device, area and service chain based event/ticket enrichment of dependent devices, services, areas (e.g., a SCA, a MSA, a site and the like) and the like. Particularly, the energy transaction processing engine 234 process the transformed data to obtain the energy efficiency improvement features.

In one embodiment, the energy transaction processing engine 234 provides a semantic value to real time energy performance and meter data corresponding to the associated model. Further, the energy transaction processing engine 234 calculates the consumption and various service quality parameter elements for various elements, such as the SCA, the MSA, a service, a meter and so on. Particularly, the energy transaction processing engine 234 calculates consumption at the level of the MSA, which is basically the aggregation of data over multiple set of meters, or an average temperature of a room (i.e., the SCA) covering a set of temperature sensors in the room, or the calculation of business load, which is the consumption value at a load consumption element (LCE), which consumes different service loads and generate useful business output. In some embodiments, the energy transaction processing engine 234 also applies various threshold evaluations, for multiple performance data types, and control backs in as required. For example, of the control, is the optimization of economizer threshold based on current weather conditions.

For example, the billing, invoicing and cost optimization engine 236 handles data related to utility service consumption, like billing, invoice, and cost associated with the consumption of the service. The billing, invoicing and cost optimization engine 236 includes multiple business logics related to utility data handling, such as notification for bill due dates, reporting for highest cost/day, bill overdue statistics, statistic regarding wrong bills like overlapping bills, incorrect bill data and so on. In some embodiments, the billing, invoicing and cost optimization engine 236 also performs carbon emission and calculation on top of utility data by taking care of multiple regions, suppliers and the like. In one embodiment, billing, invoicing and cost optimization engine 236 also encapsulates the logic of sub tenant billing.

Further, the event management module 238 handles event management functions, such as event de-duplication, event enrichment, event co-relation, event acknowledgement, event cancellation and the like. The event management module 238 reduces the number of events handled by upper layers and support user actions via an acknowledgment and a cancellation. Furthermore, the asset O and M management 240 handles standard asset management functions, such as asset lifecycle management using preventive, predictive maintenance, use of job plans, workforce management related to job plans and the like.

In addition, the energy efficiency management module 244 runs various intelligence and custom coded business logics, which use the data available at various model elements (i.e., the energy efficiency management module 244 checks at an average how much an SCA as overcooled/under cooled by checking the data over a month and comparing with appropriate thresholds). Also, the service management module 242 performs standard service management functions, such as problem and ticket management, service level agreement (SLA) management associated with the problems and tickets, manpower and efficiency management for handling these problem and tickets and policy compliance management. In one embodiment, the customer policies and regulatory policies are inputted in to the energy efficiency management module 208 by the user interface layer 210. The policy management is explained with reference to a screen 900 shown in FIG. 9.

Moreover, the configuration engine 246 handles the end user configuration and provides a user interface (UI) and automatic upload interfaces for the configuration of the entire platform. The configuration can be enterprise data, such as a configuration of an enterprise like organization hierarchy, an asset configuration such as, model and vendor, model and asset relationship like SCA, MSAs and so on, utility related information like utility suppliers and so on. The configuration engine 246 handles the complete configuration of the functional energy management architecture 200.

Further, the customer energy knowledgebase 248 includes a copy of customer applicable knowledge in form of data, such as inefficient temperature ranges and the like. The data is copied at the start of customer provisioning in the energy knowledge base 270.

In one embodiment, the energy efficiency management module 244 performs thermal profiling and derives combined temporal and spatial thermal profile characteristics of a SCA on a continuous basis by tracking changes in the profile. The energy efficiency management module 244 performs thermal profiling which is independent of the SCA's provisioned and time zones of the SCA. The energy efficiency management module 244 performs thermal profiling on thermal and asset status data by segregating and relating the data based on the service model and time zone information and then combines the profiles of the spatial and temporal distribution of the data. The energy efficiency management module 244 then compares the profile with knowledge base thresholds and raise exceptions in case if the profile crosses the thresholds.

In one embodiment, the energy efficiency management module 244 automatically rectifies the profile. In another embodiment, the energy efficiency management module 244 provides the energy management information for rectification of the profile to the energy transaction processing engine 234. The inputs to the energy efficiency management module 244 for thermal profiling include time series temperature data from the sensors and status data of assets responsible for maintaining thermal condition, service relationship between the target SCA and the assets responsible for maintaining thermal condition, policies for SCAs, and threshold percentages. The outputs of the energy efficiency management module 244 for thermal profiling include overcooling/heating and under cooling/heating % of the SCA with a granularity of day and aggregated to month, non uniformity of thermal profile in percentage, subareas in the SCA with thermal problems, subareas in the SCA which are in deviation with an average profile, deviations with policies, and auto correction of profile if possible.

Further, the energy efficiency management module 244 performs consumption profiling, by operation modes, by segregating the consumption of a MSA based on the different operation modes. The energy efficiency management module 244 then compares the different operation modes and provides information regarding normal consumption for non-core hours (for example, partial service after business hours) in comparison to the core hours (full service business hours). The profile tracking is done on a continuous basis with a granularity of daily, weekly and monthly. The energy efficiency management module 244 works independently of the MSA's provisioned and the time zones of the MSAs. The energy efficiency management module 244 works on the consumption and MSA state data (i.e., data which indicates at what mode the MSA is operational), segregates and relates based on the service model and time zone information and then compares the profile between the different MSA states.

The energy efficiency management module 244 then compares the profile with knowledge base thresholds and raise exceptions in case if the profile crosses the thresholds. Exemplary operation modes are normal mode of operation (i.e., business hours which are customer hours in a store or normal office time in an office area), partial service hours (i.e., an employee only hours in the store when full service and lighting are not required. After the store is closed down the period is referred to as afterhours i.e., OFF mode of operation when except for few essential services like power for a server etc., everything else is supposed to be shutdown). There is also possibility of reduced mode of operation i.e., demand limit hours during the business hours due to other considerations like lean business period, high tariff, demand limit tie up and so on. After profiling the consumption for each of this period, the rule detects the above normal consumption for each of the periods as compared to the normal mode period for the MSA. The daily average consumption for each period is compared with the normal hour's consumption and above normal consumption is detected. The analysis helps in the detection of loads that remain ON during afterhours because of improper operation and policies, which needs to be optimized.

Furthermore, the energy efficiency management module 244 performs eco-mode profiling. The eco-modes are different operation modes in which a site can operate using free ambient resources for the major service groups like lighting resulting in reduction of consumption from the utilities. The energy efficiency management module 244 determines potential of utilizing eco-modes (e.g., hours in eco-mode) by and collecting weather data 224 from provided weather feeds on a periodic basis. The energy efficiency management module 244 then compares the hours in eco-mode with the hours the site in eco-mode and generates a profile and raises an exception if the profile crosses the knowledgebase thresholds. The energy efficiency management module 244 also compares whether the assets providing the co-respective service group is utilizing the eco-mode to provide the service. The energy efficiency management module 244 uses the asset status data to find the eco-mode utilization, generates a profile of utilization and then raises an exception if the profile crosses the knowledgebase thresholds. In some embodiments, the energy efficiency management module 244 corrects the profile by calibrating the usage of eco-mode on a dynamic basis. The profile tracking is done on a continuous basis with a granularity of daily, weekly and monthly. The energy efficiency management module 244 works independent of a number of sites provisioned and time zones of the sites.

In addition, the energy efficiency management module 244 performs utilization profiling based on assets status data of assets. The energy efficiency management module 244 takes into account the redundancy of capacity required and arrives at the thresholds for high or low utilization. The energy efficiency management module 244 raises an exception which leads to information for changing the active and redundant capacity configuration so that improvement of utilization can be brought about resulting in improvement of efficiency, if there is a threshold violation.

Referring now to FIG. 3, which is a screen 300 that illustrates access control of a user to multiple customers, according to one embodiment. Particularly, the screen 300 illustrates mapping of the user to multiple customers. As shown in FIG. 3, the user can map to the customers by entering the user's name and selecting the customers.

Figure 4:
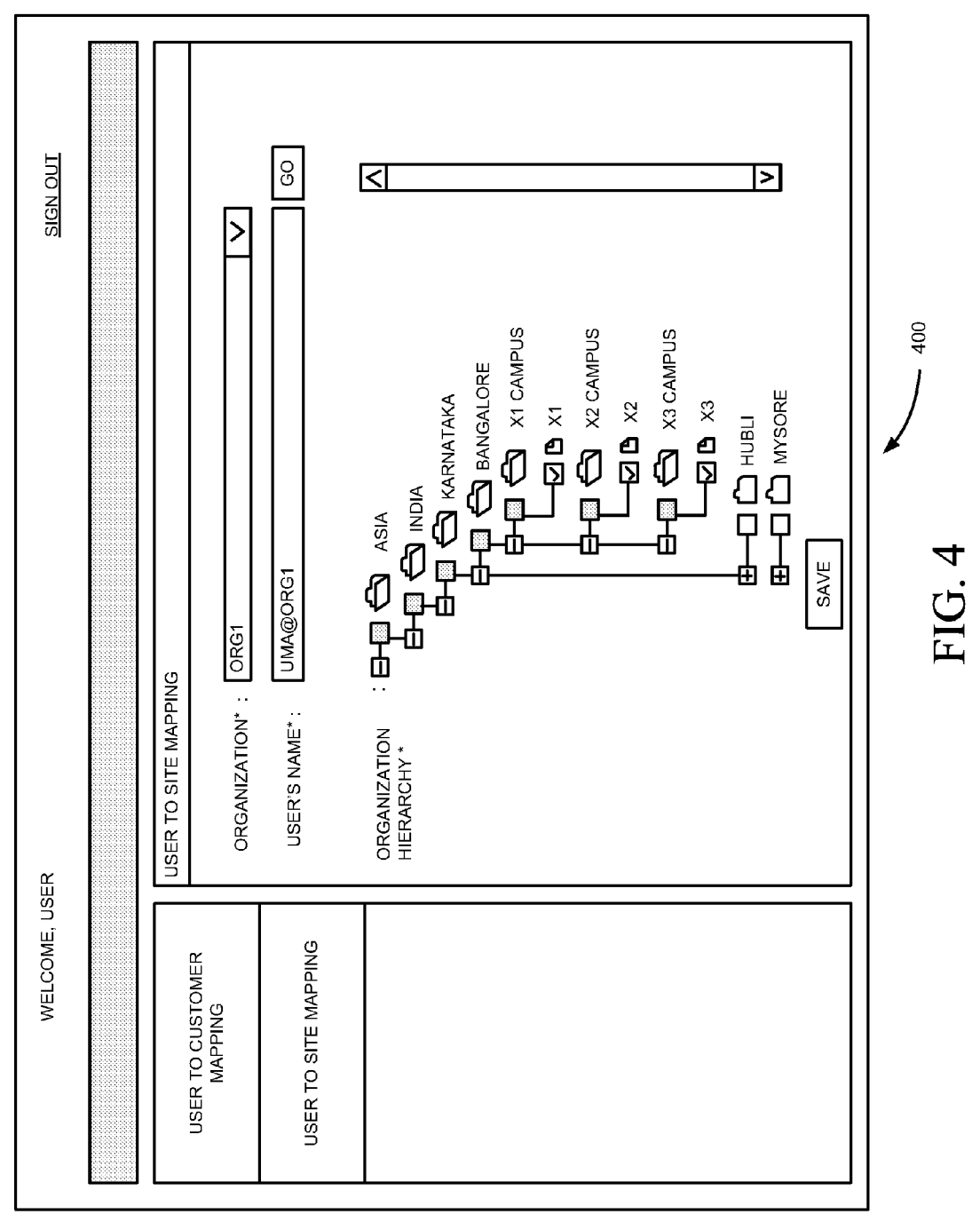

Referring now to FIG. 4, which is a screen 400 that illustrates access control of the user to a site, according to one embodiment. Particularly, the screen 300 illustrates mapping of the user to the site. As shown in FIG. 3, the user can map to the site by entering the user's name and selecting the customer in multiple locations.

Referring now to FIG. 5, which is a screen 500 that illustrates ticket screen extension, according to one embodiment. As shown in FIG. 5, the screen 500 illustrates details of the incident, dates, multi time zone and local time data and the like.

Referring now to FIG. 6, which is a screen 600 that illustrates an incident report, according to one embodiment. Particularly, the screen 600 illustrates a location incident report. As shown in FIG. 6, 602 illustrates multi organization extension. The multi organization extension is selectable as a report input criteria. Further, 604 illustrates multi time zone data added to indicate multi time zone for a site under report. Furthermore, the screen 600 illustrates information associated with a ticket, status of the ticket, information associated with the asset and the like.

Figure 7:
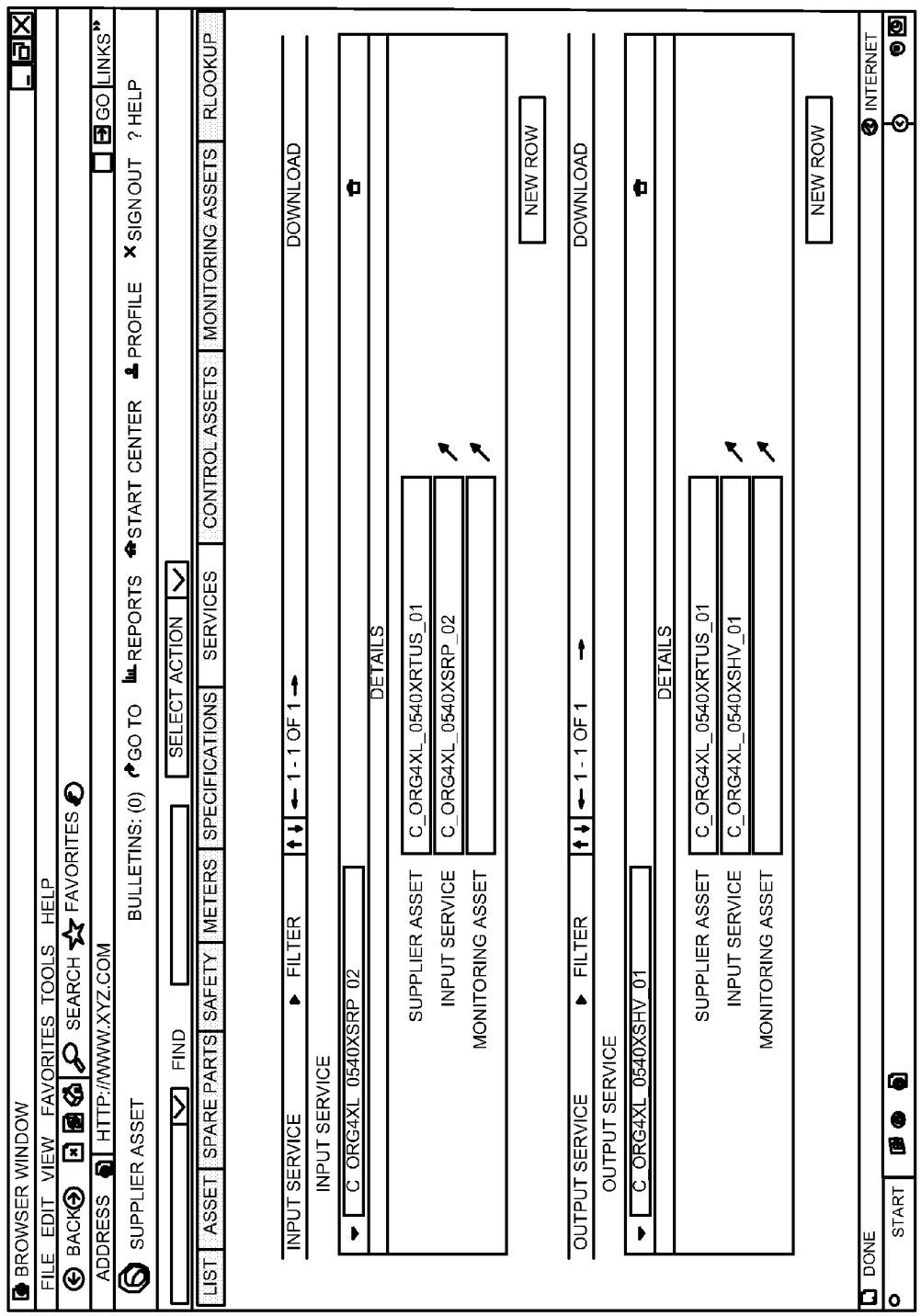
FIG. 7 is a screen illustrating services linkage to an asset system, according to one embodiment.

Referring now to FIG. 7, which is a screen 700 that illustrates services linkage to an asset system, according to one embodiment. Particularly, the screen 700 illustrates the services linkage to a supplier asset system. As shown in FIG. 7, the services include input services and output services.

Figure 8:
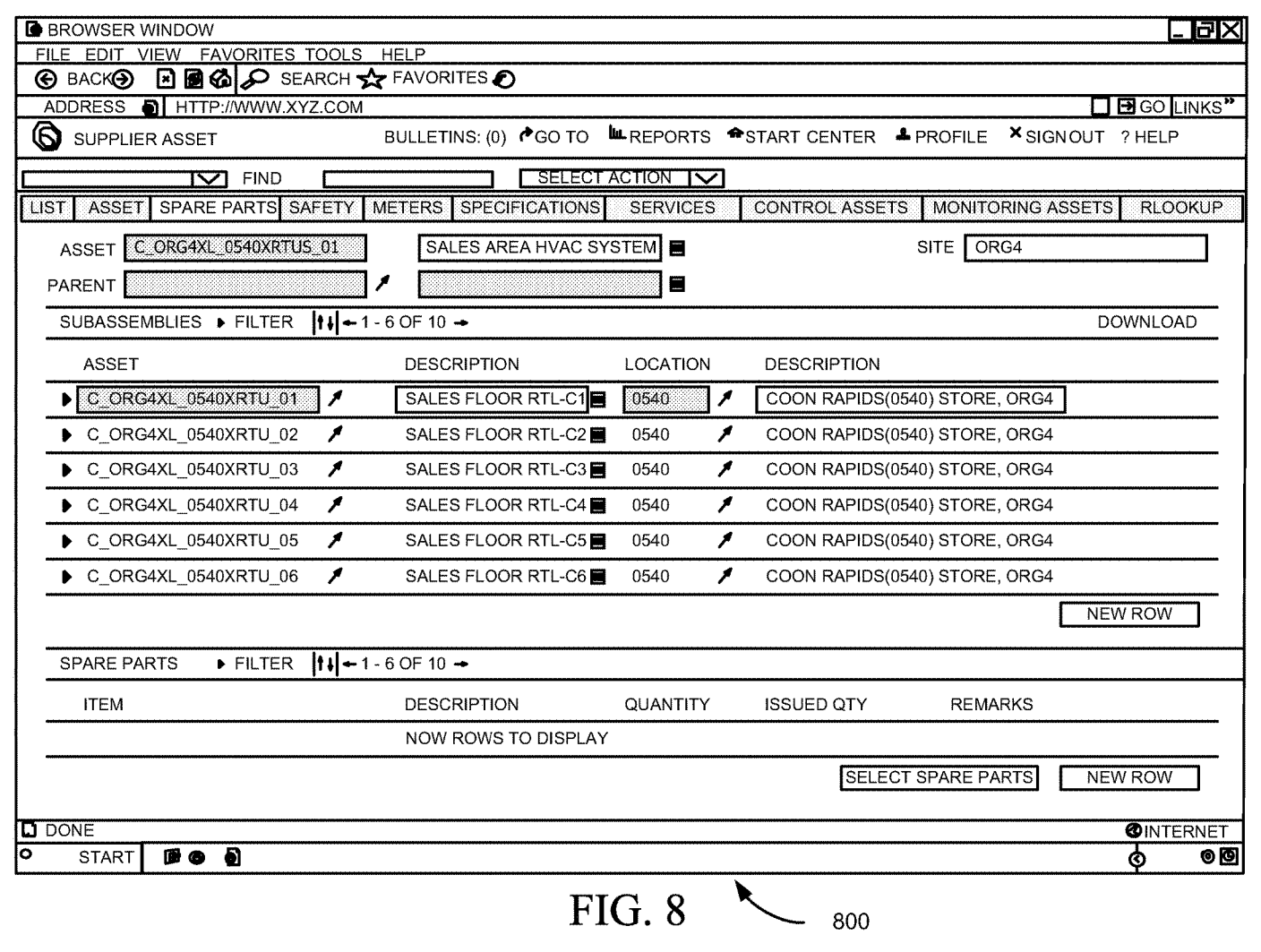

Referring now to FIG. 8, which is a screen 800 that illustrates various assets belonging to the asset system, according to one embodiment. Further, the screen 800 illustrates description, location and the like of the various assets.

Figure 9:
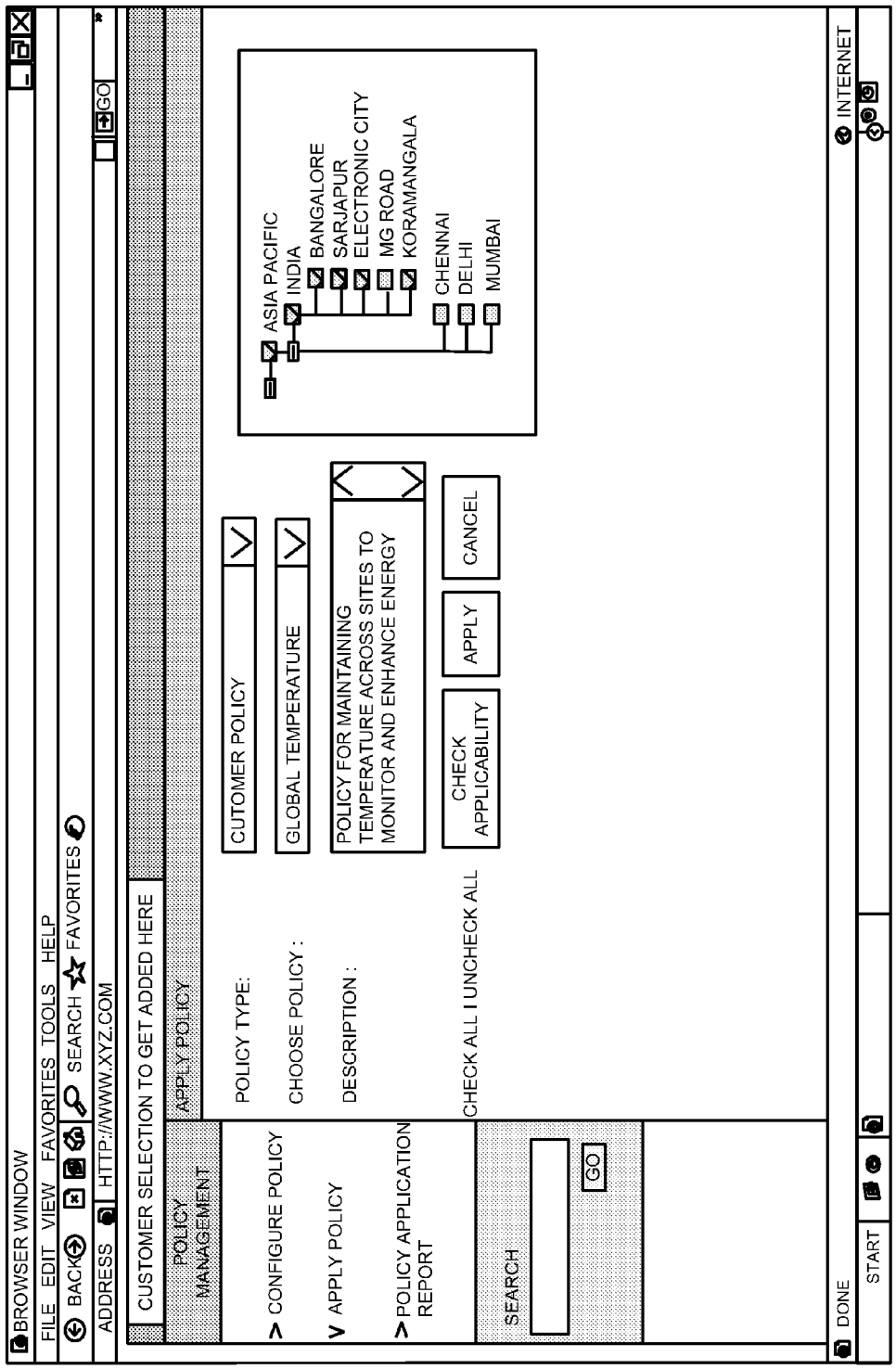
FIG. 9 is a screen illustrating policy management, according to one embodiment.

Referring now to FIG. 9, which is a screen 900 that illustrates policy management, according to one embodiment. Particularly, the screen 900 illustrates applying a policy. Further, the policy is applied by choosing a policy type and the policy. Exemplary policy types include regulatory policies and customer policies. The screen 900 also displays description associated with the chosen policy to the user.

Figure 10:
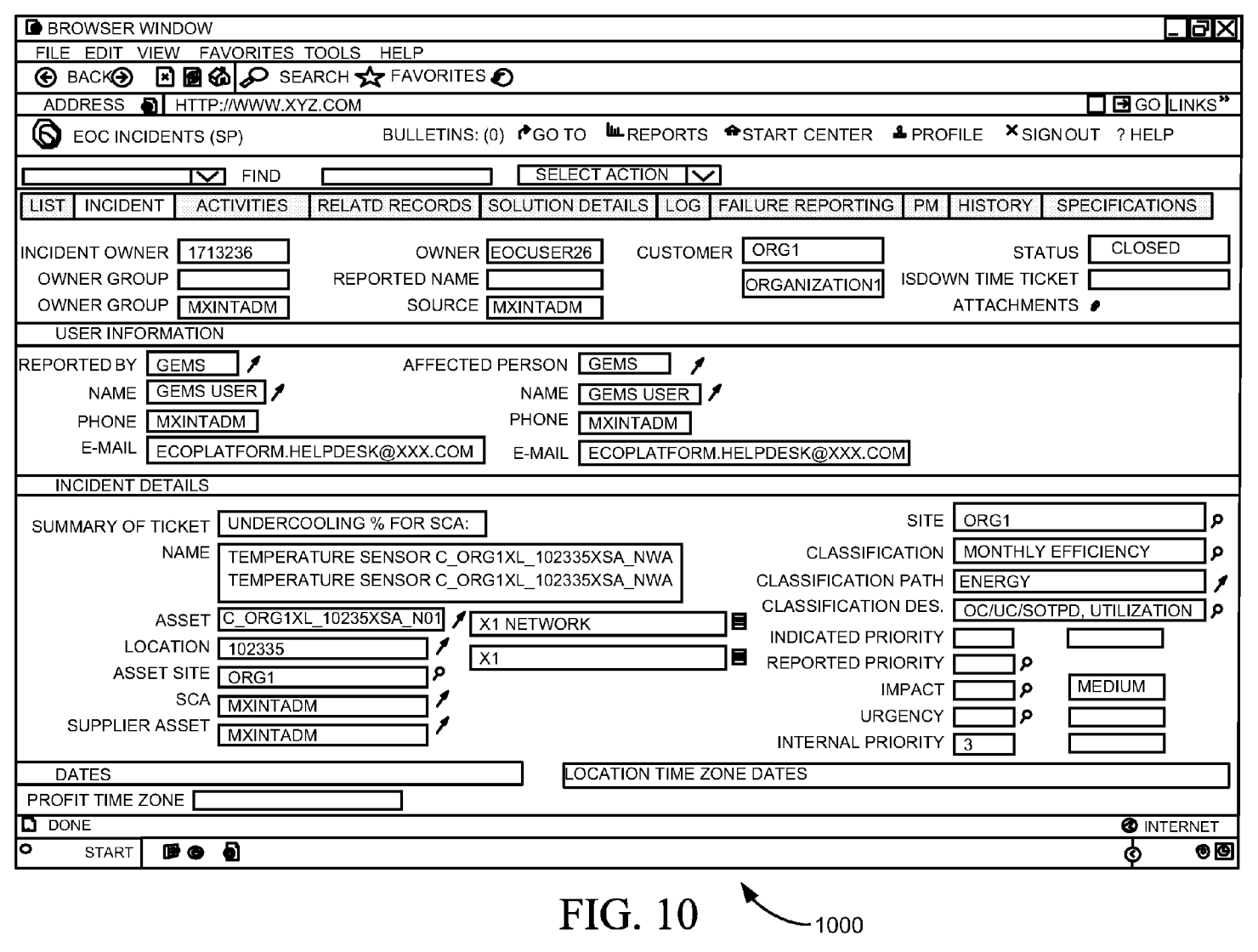

Referring now to FIG. 10, which is a screen 1000 that illustrates statistical and root-cause analysis, according to one embodiment. The screen 1000 illustrates statistical and root-cause analysis performed in a temperature threshold violation ticket. The commands for temperature threshold violation are explained in Appendix A.

Figure 11:
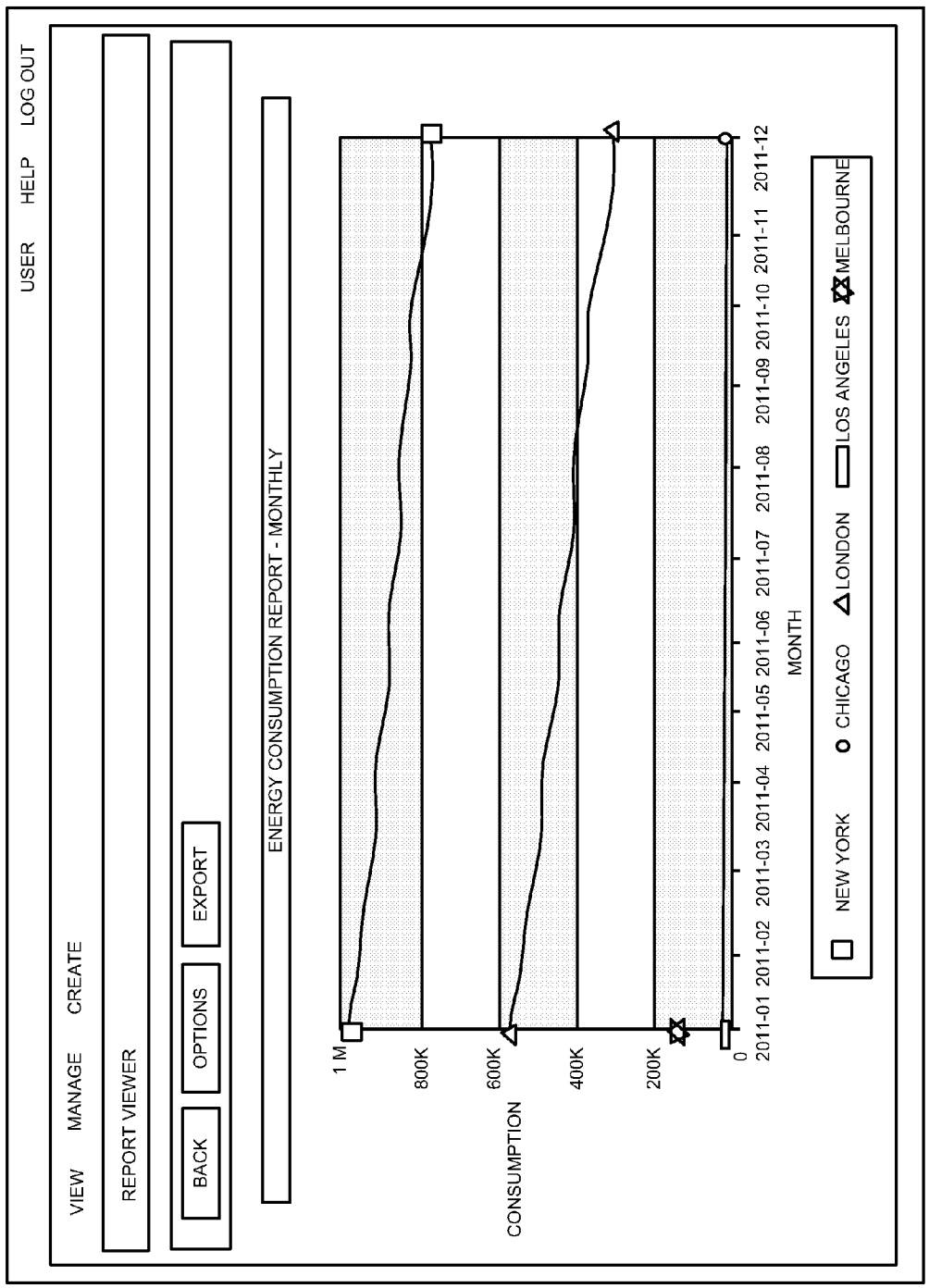
FIG. 11 illustrates a screen of an energy consumption report, according to one embodiment.

Referring now to FIG. 11, which is a screen 1100 that illustrates an energy consumption report, according to one embodiment. Particularly, the screen 1100 illustrates a monthly report of energy consumption. As shown in FIG. 11, the x-axis indicates the month (i.e., January 2011-December 2011) in which the energy consumption report is determined. Further, the y-axis indicates energy consumption in kilowatt-hours (KWH). The screen 1100 displays the energy consumption report obtained for five cities (i.e., New York, Chicago, London, Los Angeles and Melbourne) in January 2011-December 2011.

Figure 12:
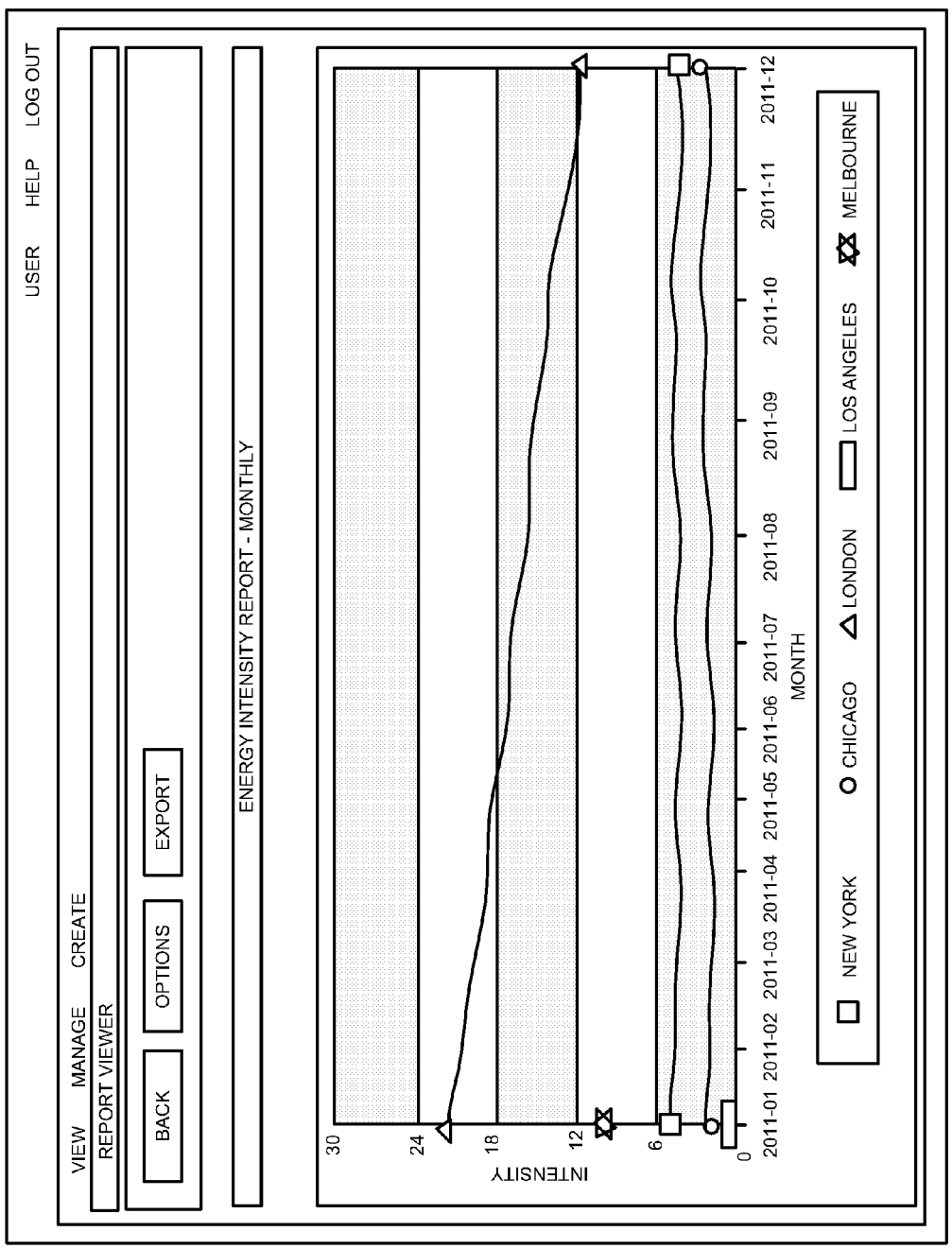
FIG. 12 illustrates a screen of an energy intensity report, according to one embodiment.

Referring now to FIG. 12, which is a screen 1200 that illustrates an energy intensity report, according to one embodiment. Particularly, the screen 1200 illustrates a monthly report of energy intensity. As shown in FIG. 12, the x-axis indicates the month (i.e., January 2011-December 2011) in which the energy intensity report is determined. Further, the y-axis indicates energy intensity in KWH. Furthermore, the screen 1200 displays the energy intensity report obtained for five cities (i.e., New York, Chicago, London, Los Angeles and Melbourne) in January 2011-December 2011.

Figure 13:
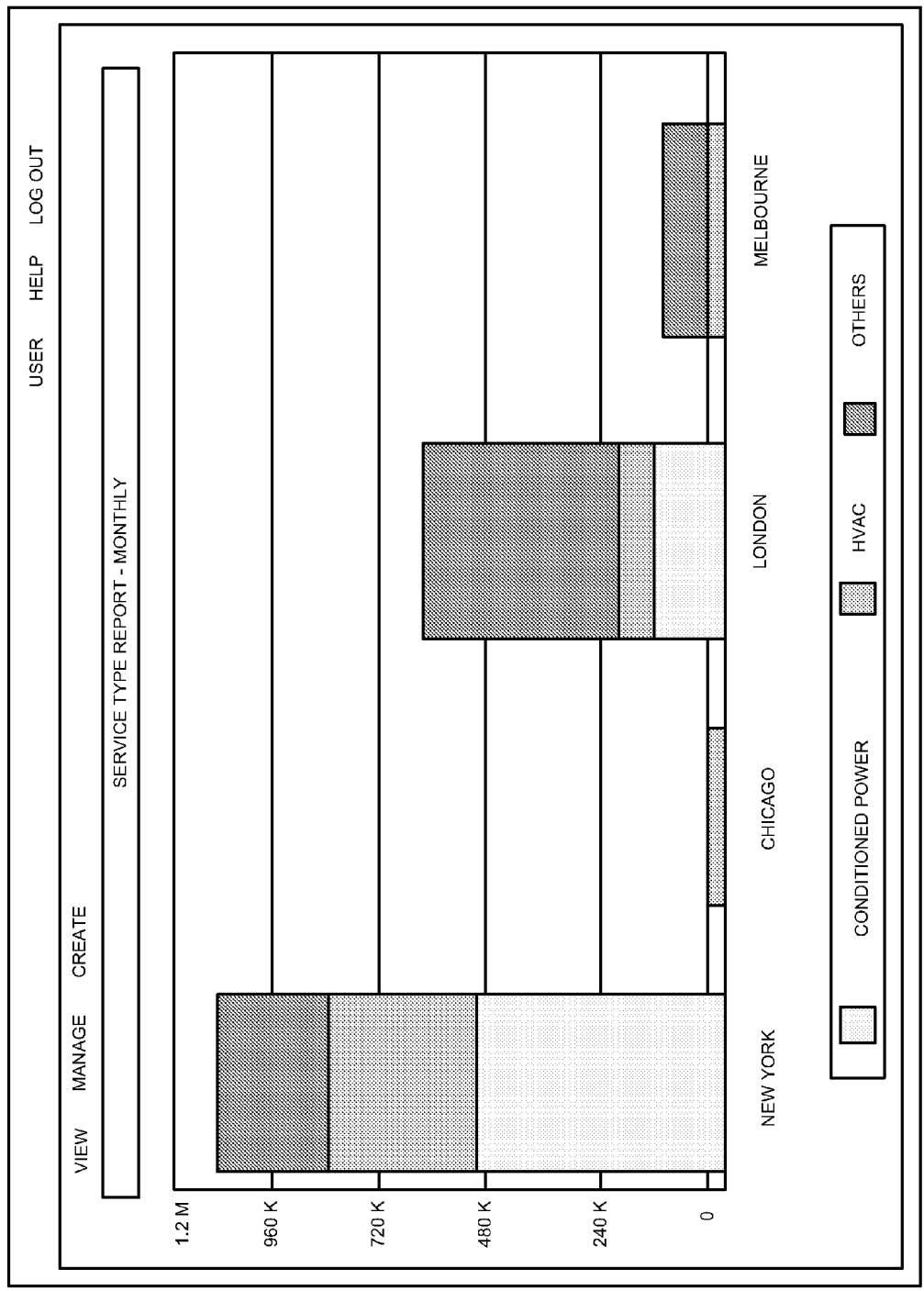
FIG. 13 illustrates a screen of a consumption by service type report, according to one embodiment.

Referring now to FIG. 13, which is a screen 1300 that illustrates a consumption by service type report, according to one embodiment. Particularly, the screen 1300 illustrates a monthly report of energy consumption for various service types (i.e., conditioned power, heating, ventilation, air conditioning (HVAC) and others) in various cities (i.e., New York, Chicago, London and Melbourne).

Figure 14:
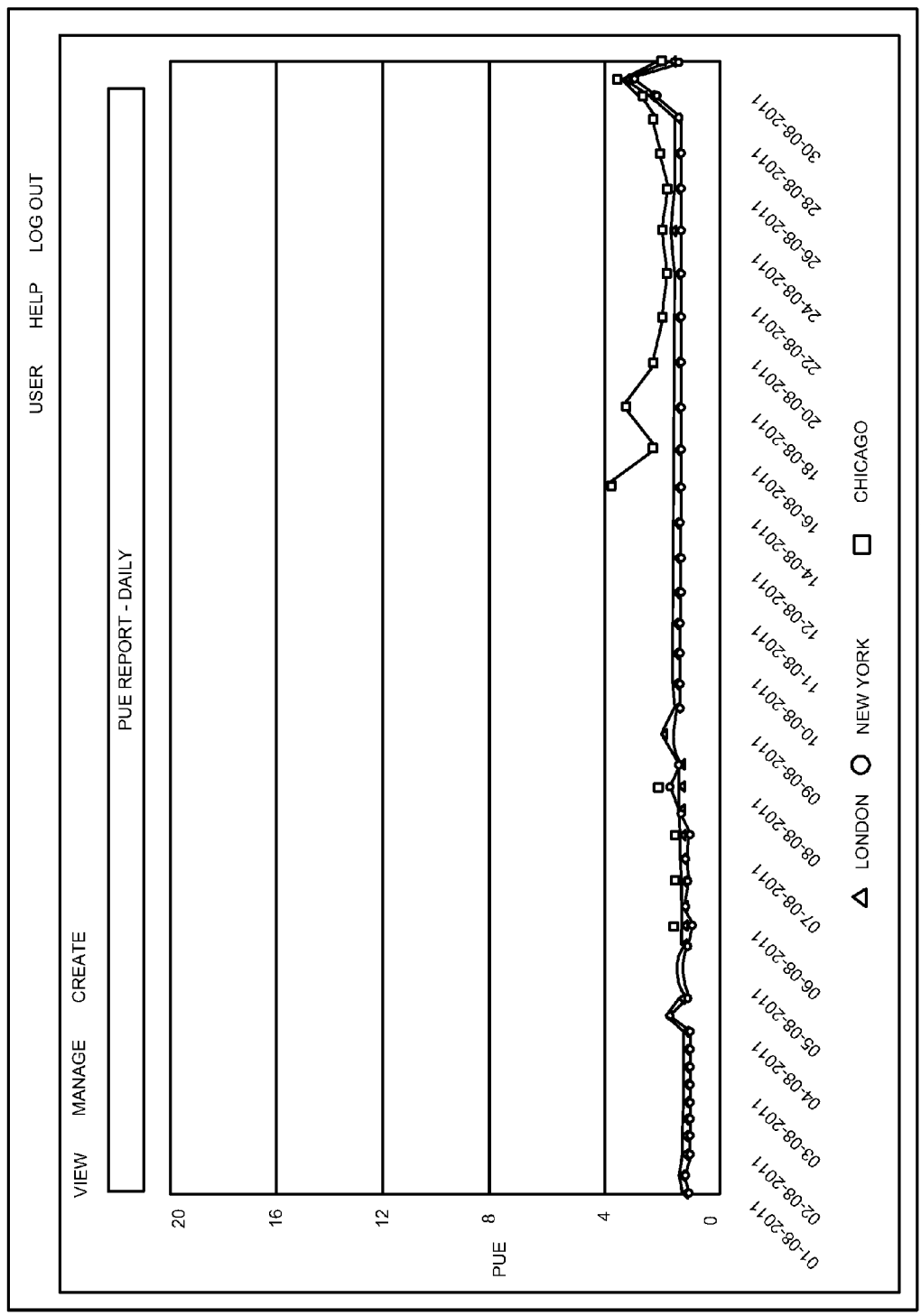
FIG. 14 illustrates a screen of a power usage effectiveness (PUE) report, according to one embodiment.

Referring now to FIG. 14, which is a screen 1400 that illustrates a power usage effectiveness (PUE) report, according to one embodiment. Particularly, the screen 1400 illustrates a daily report of power usage effectiveness of various cities (i.e., New York, Chicago, and London).

Figure 15:
FIG. 15 is a screen illustrating baseline data, according to one embodiment.

Referring now to FIG. 15, which is a screen 1500 that illustrates baseline data, according to one embodiment. Particularly, the screen 1500 illustrates history of baseline data. The history of the baseline data includes target percentage (%) saving, baseline consumption (KWH) for various service types and values of normalization parameters, such as business load, a business normalization factor, estimated operational days and the like. The baseline consumption and normalization parameter values are entered for each month in a year.

Figure 16:
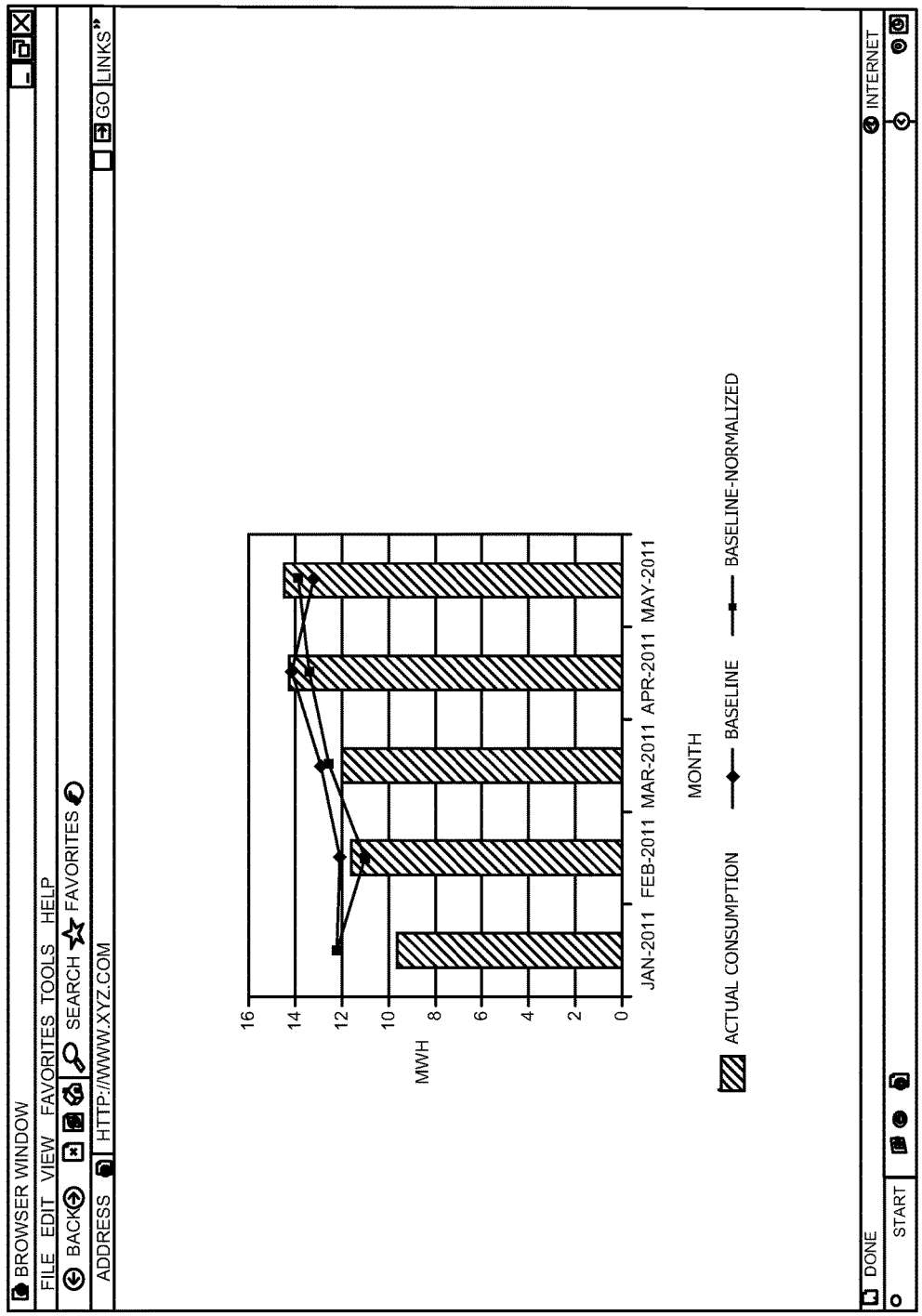
FIG. 16 is a screen illustrating total consumption report with baseline data, according to one embodiment.

Referring now to FIG. 16, which is a screen 1600 that illustrates a total consumption report with baseline data, according to one embodiment. As shown in FIG. 16, the x-axis indicates the month (i.e., January 2011-May 2011) in which the total consumption report is determined. Further, the y-axis indicates consumption in mega watts per hour (MWH). Furthermore, the screen 1600 illustrates total consumption, baseline consumption and baseline-normalized consumption.

Figure 17A:
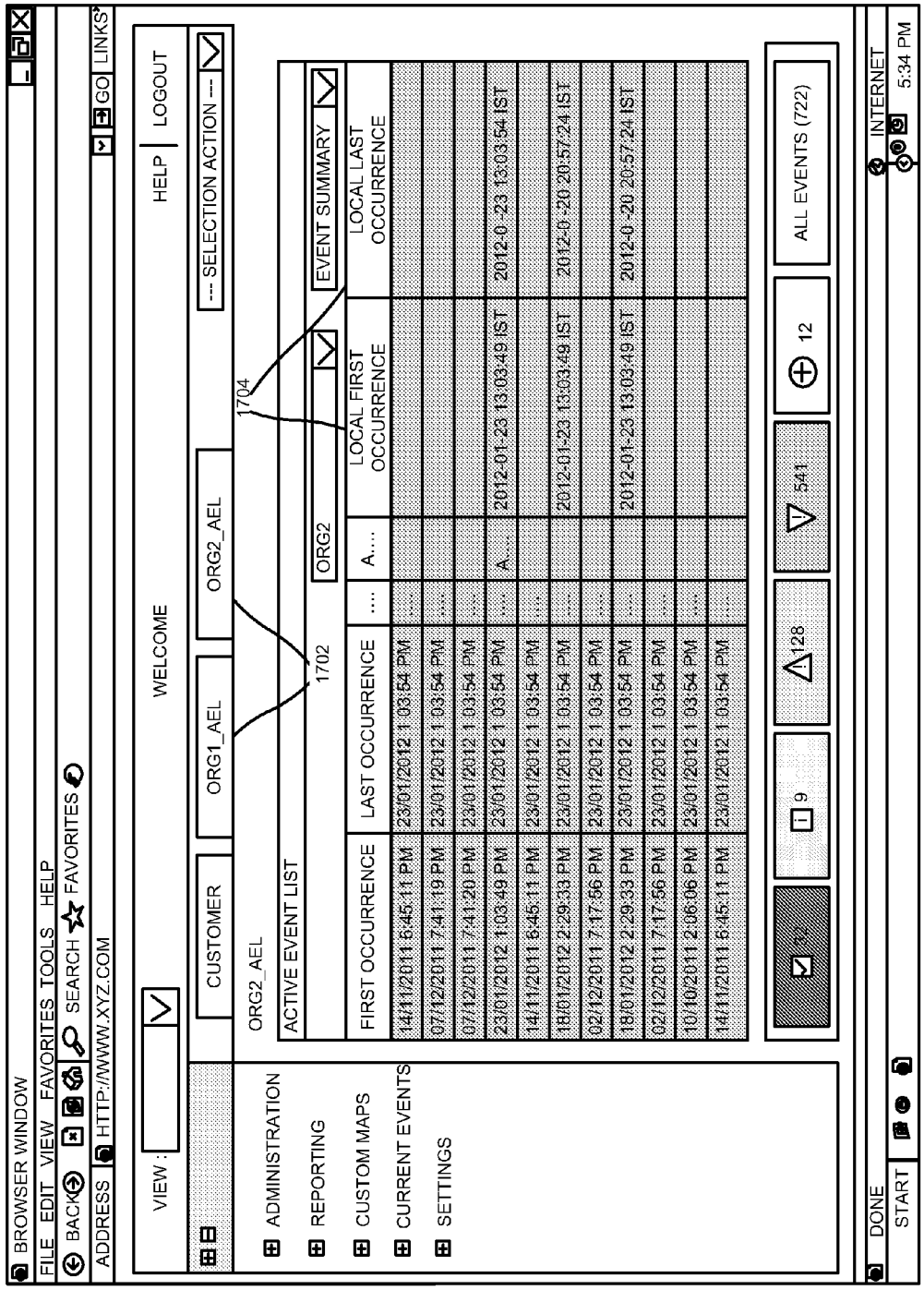

Referring now to FIGS. 17A-B, which are screens 1700A and 1700B illustrating event management, according to one embodiment. Particularly, the screen 1700A illustrates event viewer extension. As shown in FIG. 17A, the screen 1700A displays an active event list of a customer. Further, the active event list includes first occurrence of the events, last occurrence of the events, local first occurrence of the events and local last occurrence of the events. Furthermore, 1702 illustrates multi organization extension. In addition, 1704 illustrates date updated with multi time zone. Particularly, the 1704 illustrates the local first occurrence and local last occurrence.

Also as shown in FIG. 17B, the screen 1700B displays an active event list including an organization identity (ORG ID), a site ID, summary of the events, first occurrence of the events, last occurrence of the events. Further, the screen 1700B displays warning events, minor events, major events, and critical events.

Figure 19:

Referring now to FIGS. 18 and 19, which are screens 1800 and 1900 illustrating asset management, according to one embodiment. Particularly, the screen 1800 illustrates information associated with the asset. For example, the information associated with the asset includes an ID, type, status, purchase information, downtime, and the like. Particularly, the screen 1900 illustrates preventive maintenance of the asset.

Figure 20:
FIG. 20 is a screen illustrating billing management, according to one embodiment.

Referring now to FIG. 20, which is a screen 2000 that illustrates billing management, according to one embodiment. Particularly, the screen 2000 illustrates achieved % savings for year 2011 in Dollars (USD).

Figure 21:
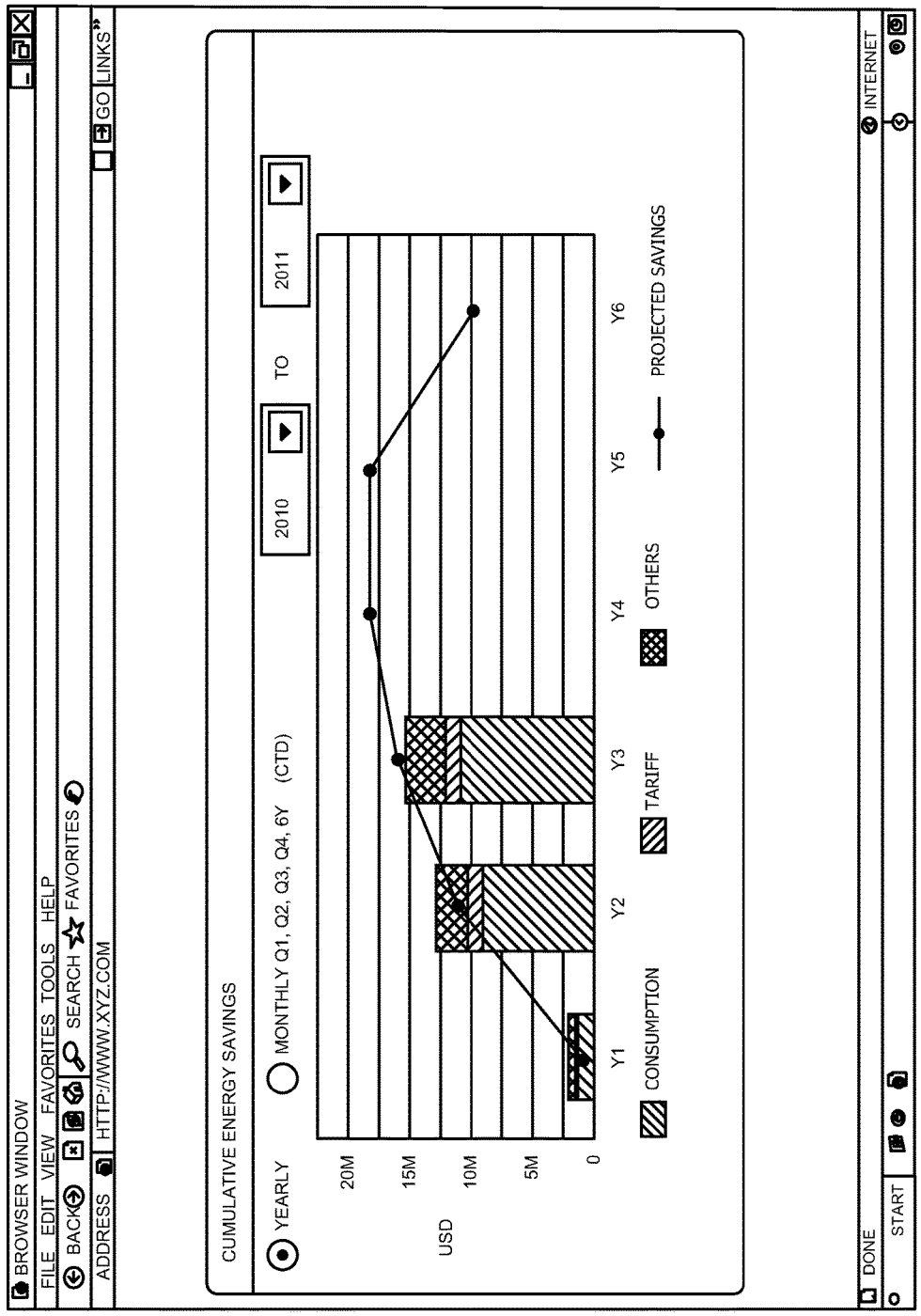
FIG. 21 is a screen illustrating invoicing and cost management, according to one embodiment.

Referring now to FIG. 21, which is a screen 2100 that illustrates invoicing and cost management, according to one embodiment. Particularly, the screen 2100 illustrates a yearly report of cumulative energy savings. As shown in FIG. 21, the x-axis indicates the year (i.e., Y1-Y6). Further, the y-axis indicates USD. Furthermore, the screen 2100 illustrates the projected savings by considering the energy consumption, tariff and the like.

Figure 22:
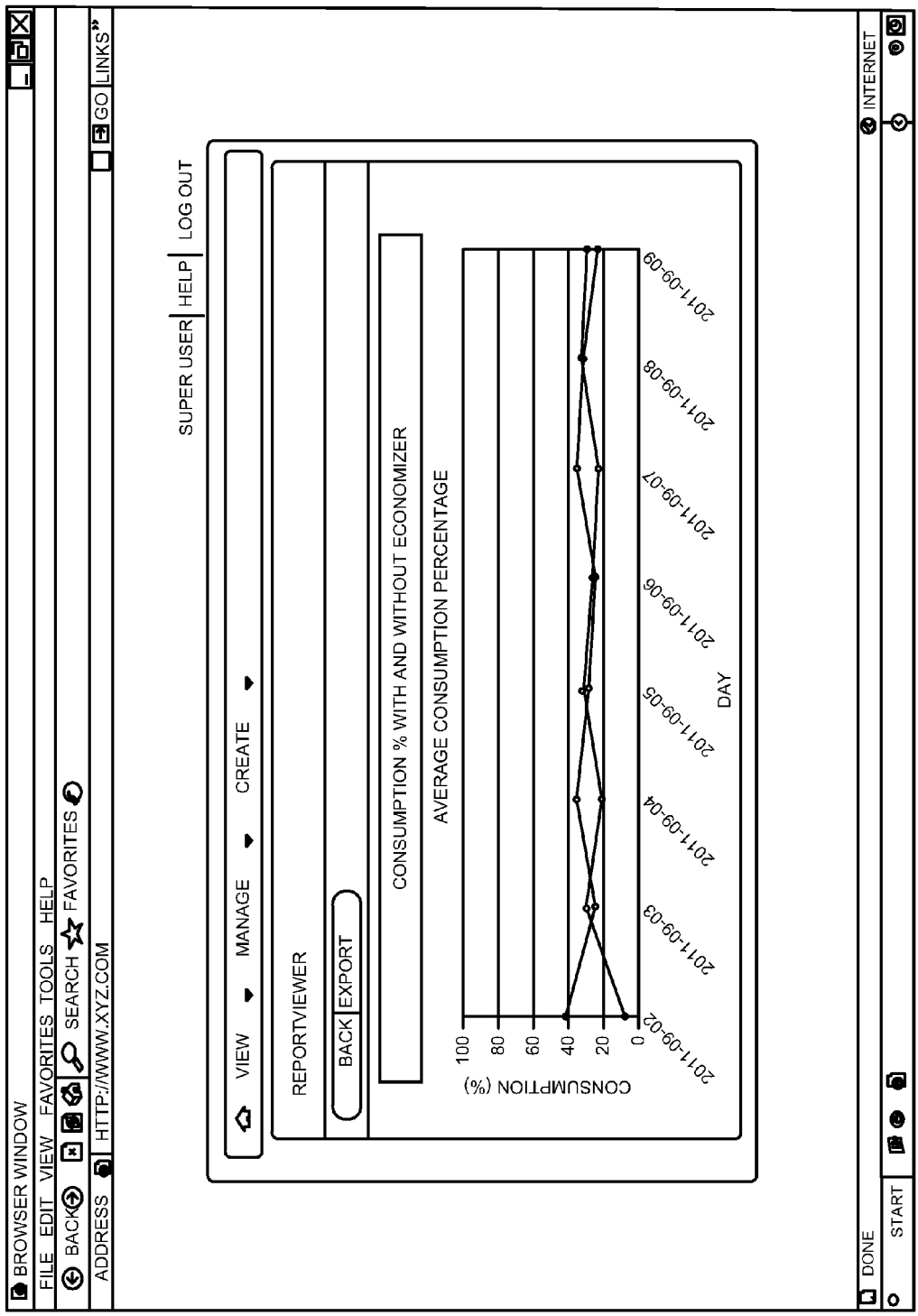
FIG. 22 is a screen illustrating eco-mode profiling, according to one embodiment.

Referring now to FIG. 22, which is a screen 2200 that illustrates eco-mode profiling, according to one embodiment. Particularly, the screen 2200 illustrates a daily report of average consumption in percentage. As shown in FIG. 22, the x-axis indicates the date (i.e., Sep. 2, 2011-Sep. 9, 2011) in which the total consumption report is determined. Further, the y-axis indicates consumption in percentage.

Referring now to FIG. 23, which is a screen 2300 that illustrates thermal profiling, according to one embodiment. The screen 2300 illustrates thermal analysis for a SCA.

Figure 24:
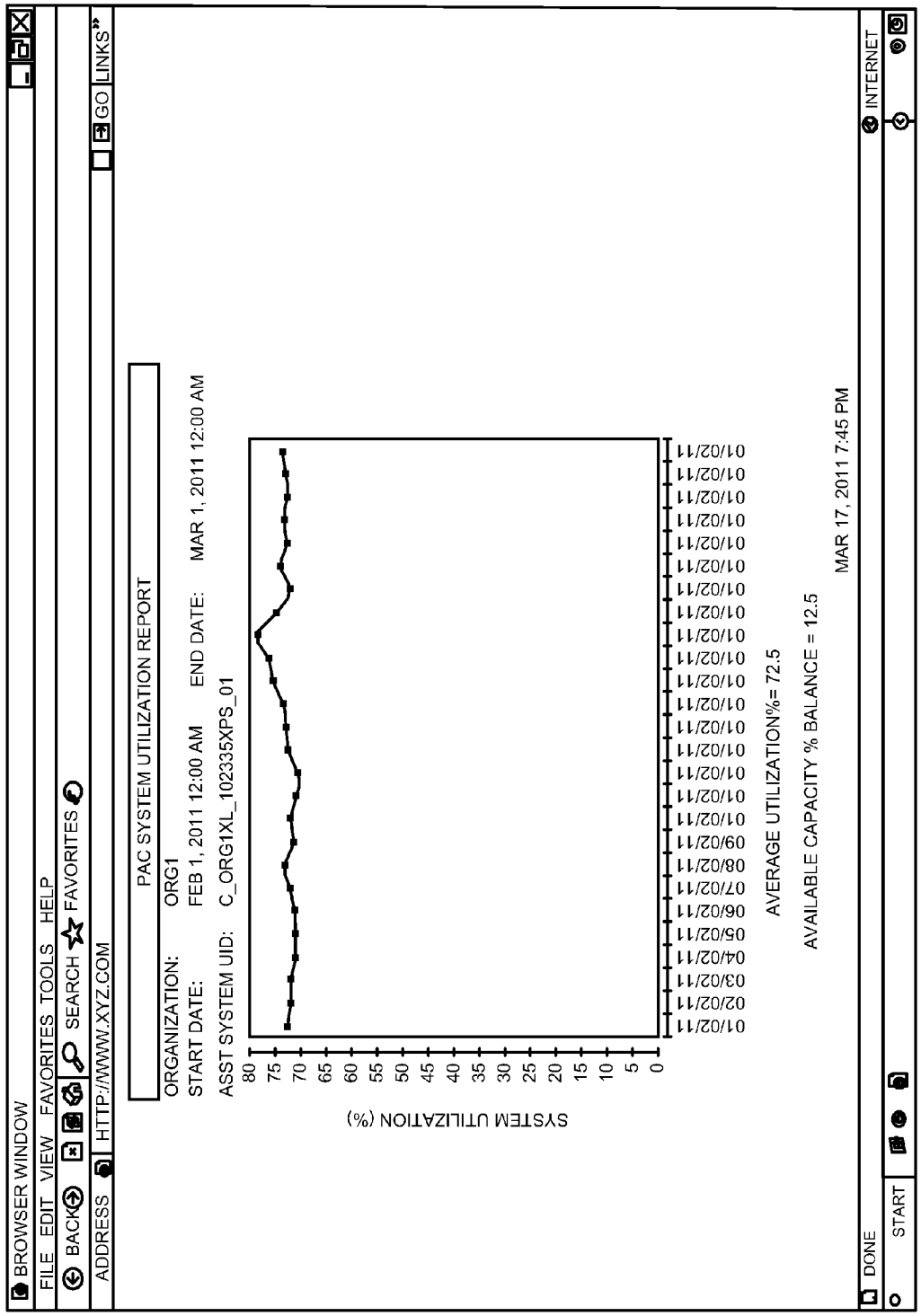
FIG. 24 is a screen illustrating asset utilization and capacity profiling, according to one embodiment.

Referring now to FIG. 24, which is a screen 2400 that illustrates asset utilization and capacity profiling, according to one embodiment. The screen 2400 illustrates a daily report of system utilization. Particularly, the screen 2400 illustrates a daily report of cooling/heating %.

Figure 25:
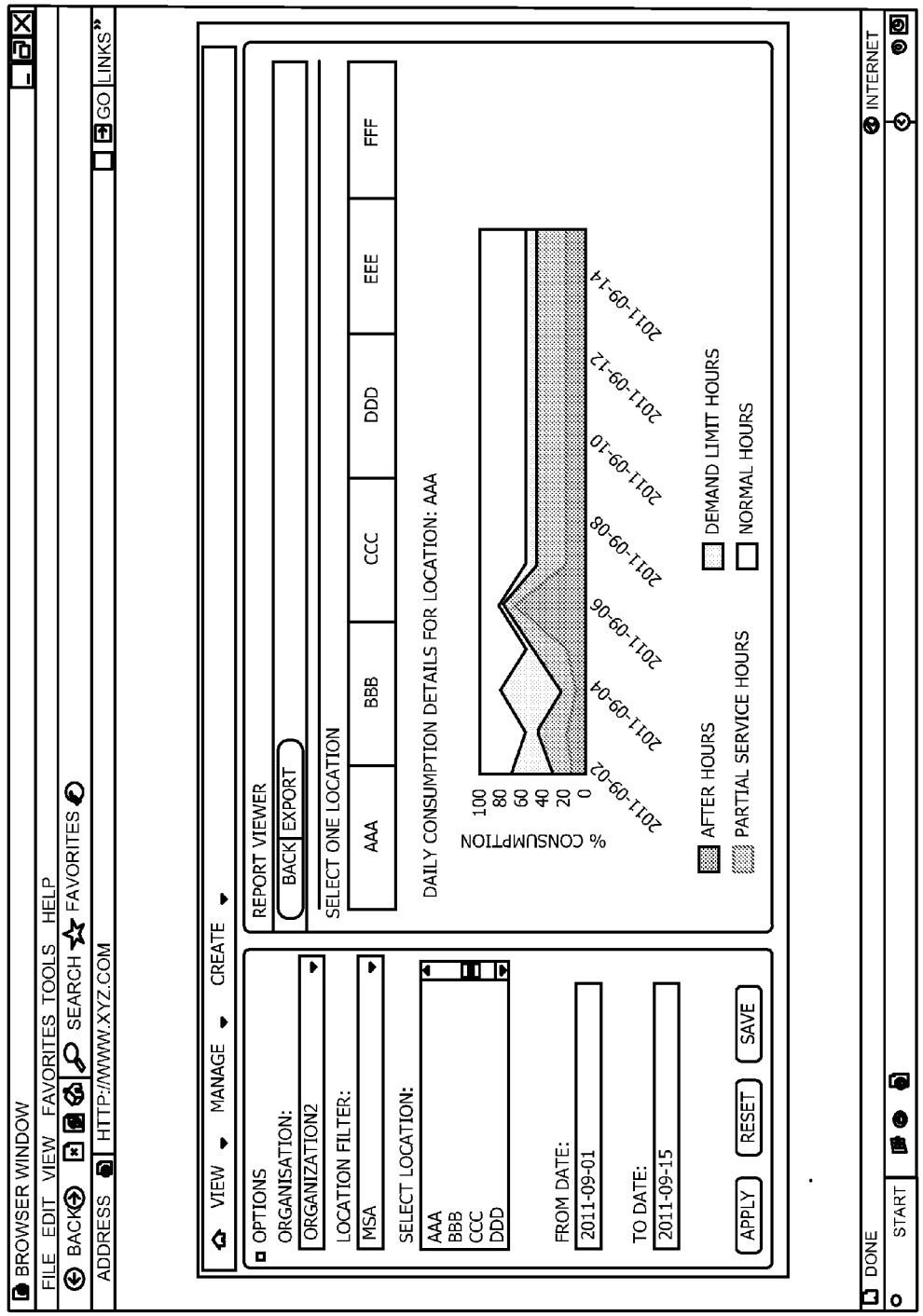
FIG. 25 is a screen illustrating consumption profiling by an operation mode, according to one embodiment.

Referring now to FIG. 25, which is a screen 2500 that illustrates consumption profiling by an operation mode, according to one embodiment. Particularly, the screen 2500 illustrates a daily report for consumption details of a location. As shown in FIG. 25, the x-axis indicates the date (i.e., Feb. 1, 2011-Feb. 28, 2011). Further, the y-axis indicates system utilization in percentage.

Figure 26:
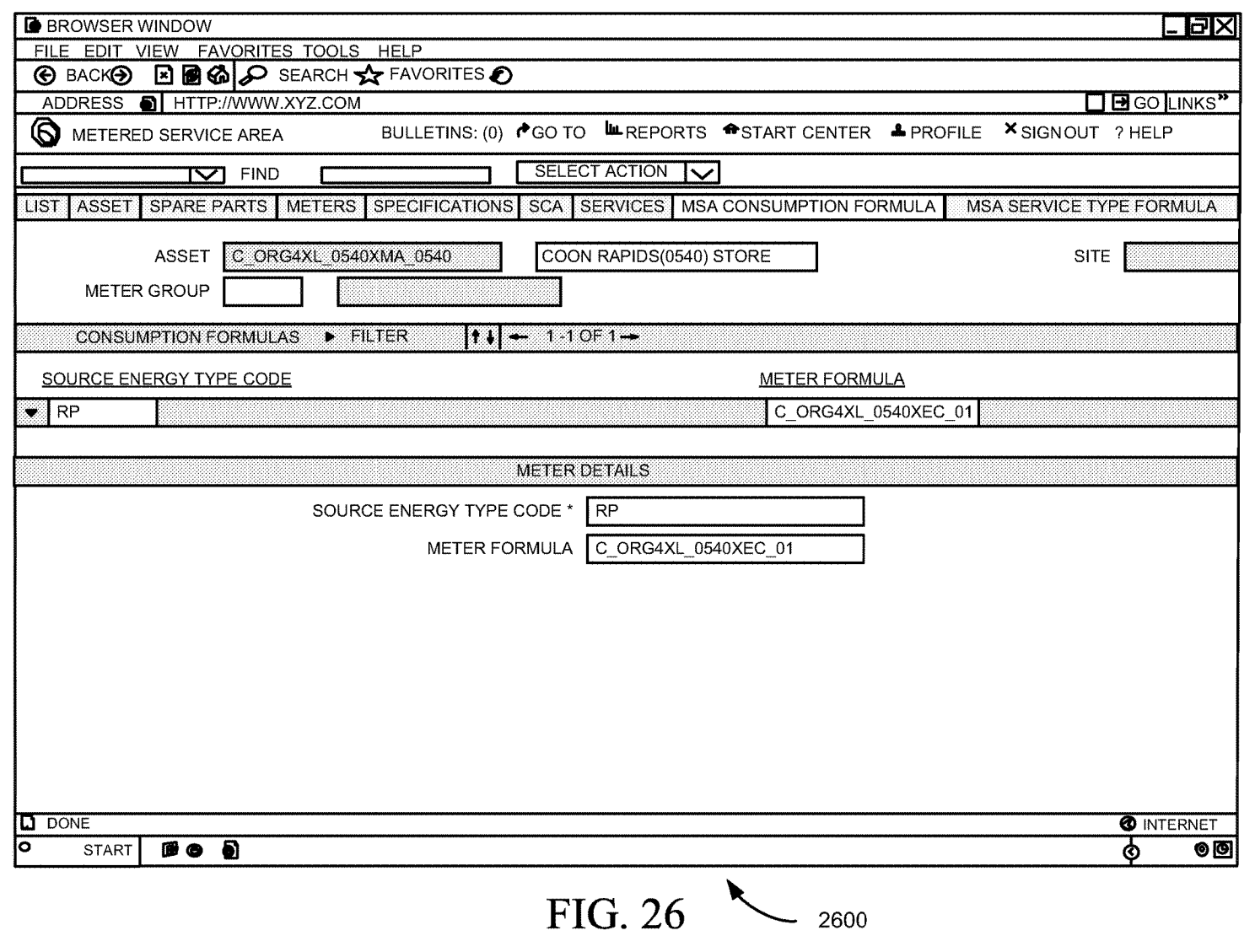
Figure 27:
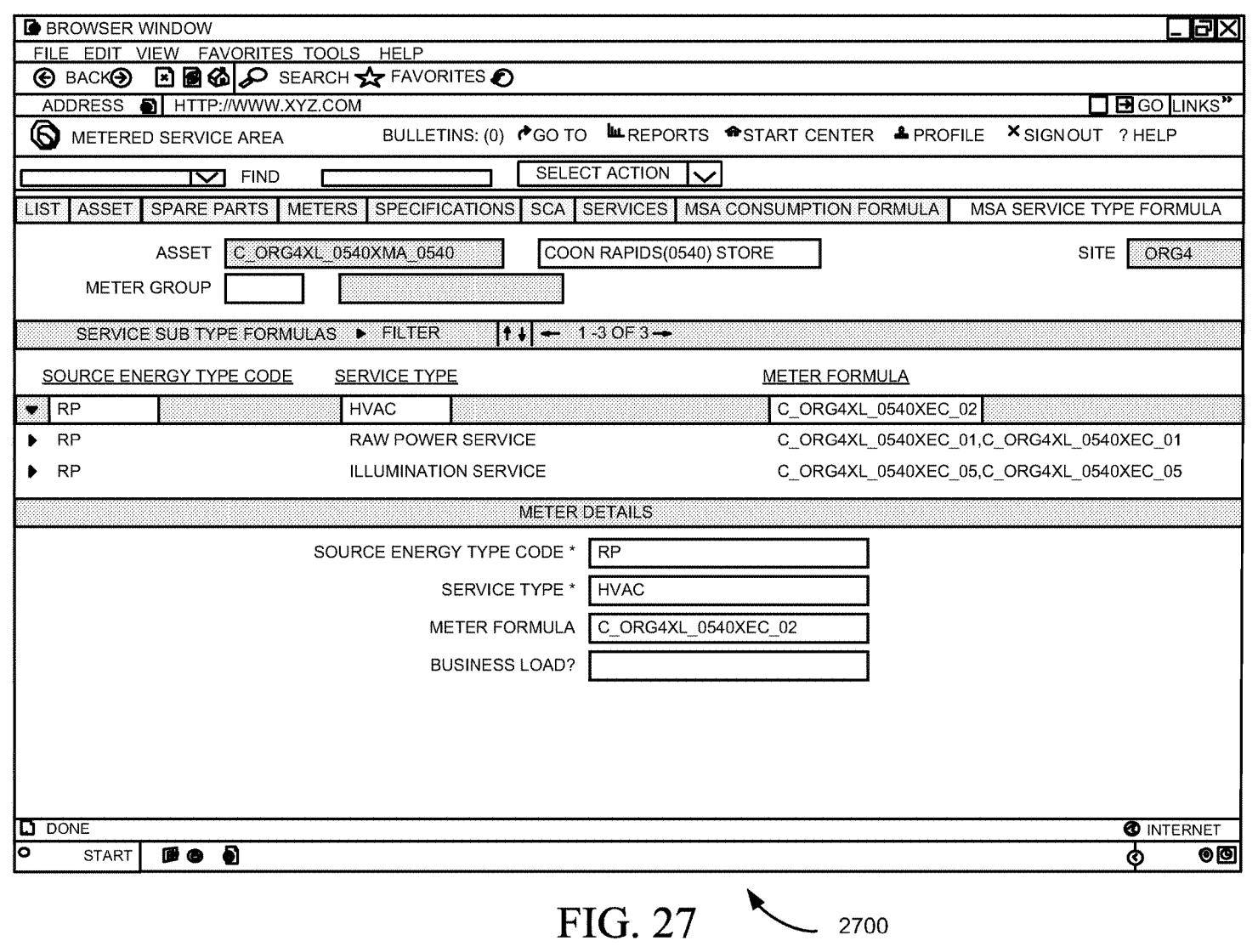
Figure 28:
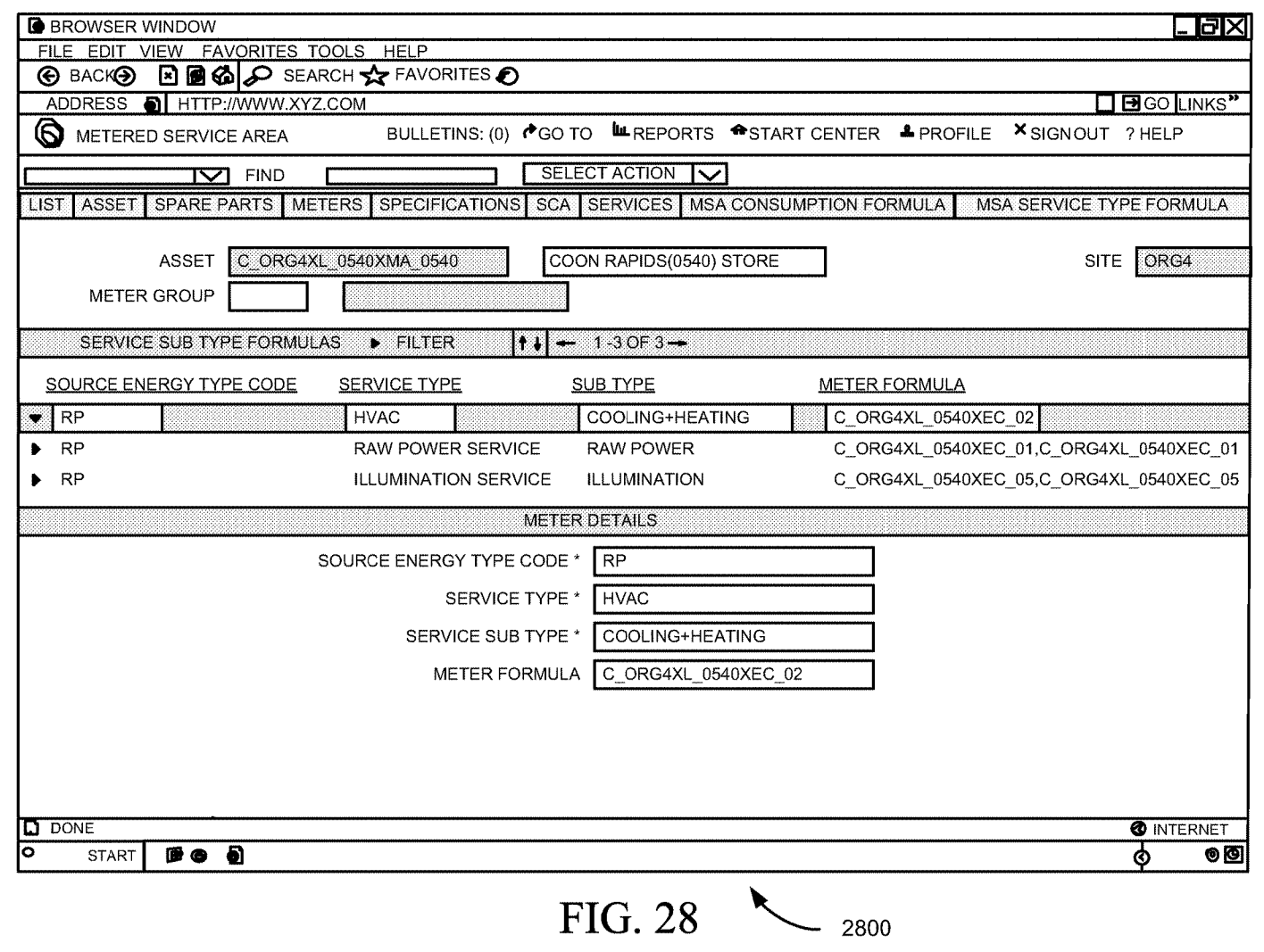

Referring now to FIGS. 26-28, which are screens 2600, 2700 and 2800 illustrating virtual metering, according to one embodiment. Particularly, the screen 2600 illustrates a MSA consumption formula. Particularly, the screen 2700 illustrates a MSA service type formula. Particularly, the screen 2800 illustrates service sub-type formulas.

Figure 29:
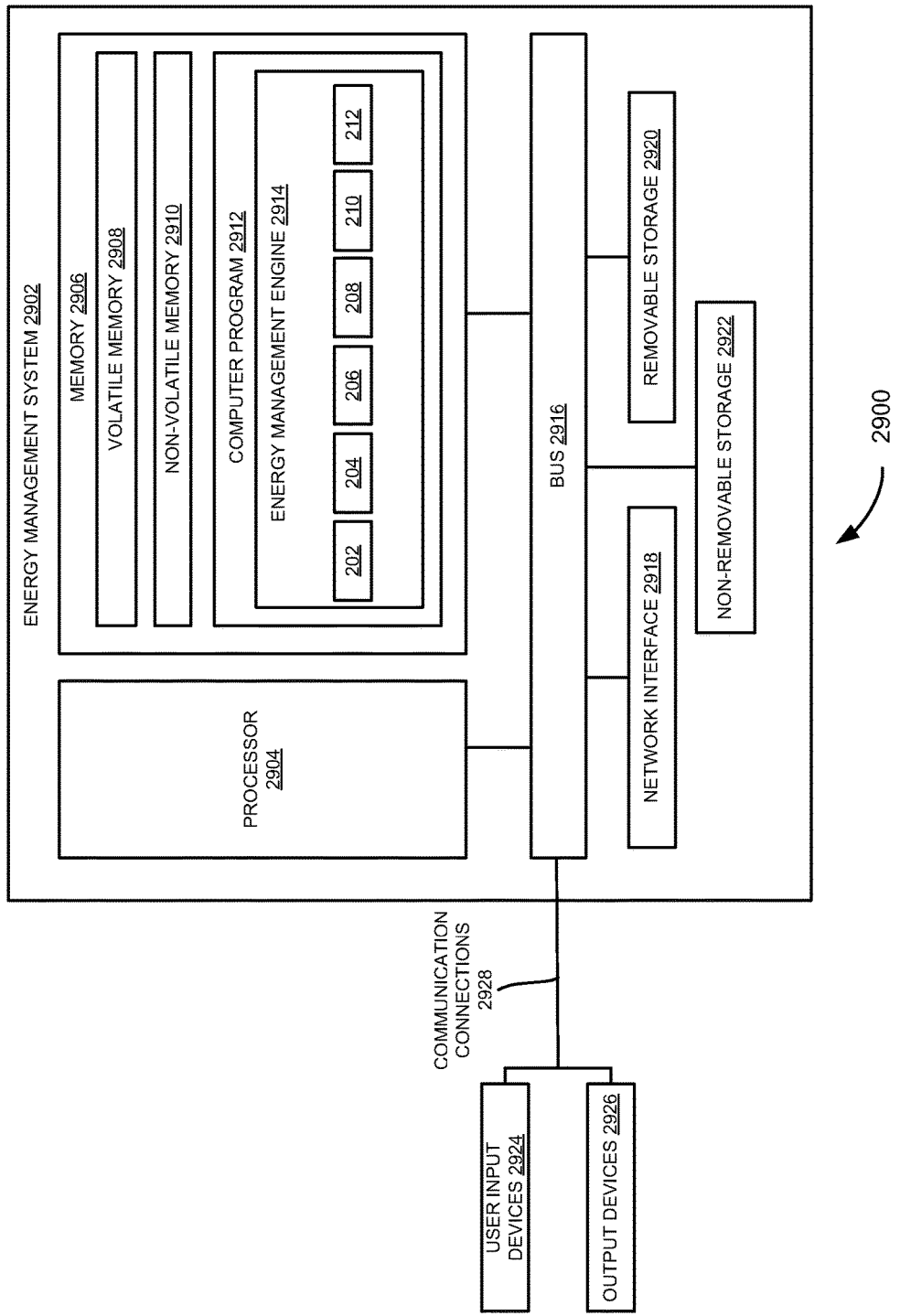
FIG. 29 illustrates an energy management system (EMS) for energy management of the multi customer distributed facilities located in different time zones, such as the one shown in FIGS. 1 and 2, according to one embodiment.

Referring now to FIG. 29, which illustrates an energy management system (EMS) 2902 for energy management of the multi customer distributed facilities located in different time zones, such as the one shown in FIGS. 1 and 2, according to one embodiment. FIG. 29 and the following discussions are intended to provide a brief, general description of a suitable computing environment in which certain examples of the inventive concepts contained herein are implemented.

The EMS 2902 includes a processor 2904, memory 2906, a removable storage 2920, and a non-removable storage 2922. The EMS 2902 additionally includes a bus 2916 and a network interface 2918. As shown in FIG. 29, the EMS 2902 includes access to the computing system environment 1100 that includes one or more user input devices 2924, one or more output devices 2926, and one or more communication connections 2928 such as a network interface card and/or a universal serial bus connection.

Exemplary user input devices 2924 include a digitizer screen, a stylus, a trackball, a keyboard, a keypad, a mouse and the like. Exemplary output devices 2926 include a display unit of the personal computer, a mobile device, and the like. Exemplary communication connections 2928 include a local area network, a wide area network, and/or other network.

The memory 2906 further includes volatile memory 2908 and non-volatile memory 2910. A variety of computer-readable storage media are stored in and accessed from the memory elements of the EMS 2902, such as the volatile memory 2908 and the non-volatile memory 2910, the removable storage 2920 and the non-removable storage 2922. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 2904, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 2904 also includes embedded controllers, such as generic or programmable logic devices or arrays, application specific integrated circuits, single-chip computers, smart cards, and the like.

Examples of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 2904 of the EMS 2902. For example, a computer program 2912 includes machine-readable instructions capable of managing energy of the multi customer distributed facilities located in different time zones in the EMS 2902, according to the teachings and herein described examples of the present subject matter. In one example, the computer program 2912 is included on a compact disk-read only memory (CD-ROM) and loaded from the CD-ROM to a hard drive in the non-volatile memory 2910. The machine-readable instructions cause the EMS 2902 to encode according to the various examples of the present subject matter.

As shown in FIG. 29, the computer program 2912 includes the energy management engine 2914. Further, the energy management engine 2914 includes a data acquisition/integration layer 202, a data management layer 204, an energy transaction layer 206, an energy efficiency management layer 208, a user interface layer 210 and a framework and utilities layer 212. For example, the energy management engine 2914 can be in the form of instructions stored on a non-transitory computer-readable storage medium. The non-transitory computer-readable storage medium having the instructions that, when executed by the EMS 2902, causes the EMS 2902 to perform the method above.

In one embodiment, associated energy models of the multi customer distributed facilities are formed based on parameters, such as facility characteristics, device characteristics, service characteristics, customer needs, available energy sources, customer policies, regulatory policies and the like using a user interface layer. Further, the data acquisition/integration layer 202 obtains data associated with energy management of the multi customer distributed facilities based on the associated energy models. Exemplary data includes automated meter data, emissions data, digital invoice data, device and sensor data, enterprise resource planning (ERP) data, weather data, emergency alert data, service desk data and the like.

Furthermore, the data management layer 204 transforms the obtained data for energy management of the multi customer distributed facilities. In addition, the energy transaction layer 206 process the transformed data to obtain energy efficiency improvement features, such as consumption profiling by an operation mode, thermal profiling by service consumption, normalization of data obtained from multiple time zones, consumption data profiling by service type using virtual meters and model information and intelligent estimation techniques for missing consumption information, thermal profiling of SCAs, eco-mode profiling, savings estimation, asset utilization and capacity profiling, data validation based on customer and region characteristics, correlated validation, correlated data, device characteristic validation, industry, past performance, climate, policies, load conditions, and service for validation, device, area and service chain based event/ticket enrichment of dependent devices, services, areas (a SCA, a MSA and a site) and the like.

Moreover, the energy transaction layer 206 generates control commands using the processed data and associated one or more pre-defined thresholds and set-points. In one exemplary implementation, the energy transaction layer 206 generates the control commands based on the processed data, associated one or more pre-defined thresholds and set-points and dynamic decisions obtained from the energy efficiency management layer 208. Exemplary control commands include thermal control, consumption control, operational modes control, utilization control, demand control, eco-mode control, energy source control, carbon emission control, performance monitoring control and the like.

In one embodiment, the energy efficiency management layer 208 dynamically updates the one or more predefined thresholds and set-points based on operational data obtained from the energy transaction layer 206. In another embodiment, the energy efficiency management layer 208 updates the one or more predefined thresholds and set-points based on the energy knowledge base in the framework and utilities layer 212. Further, the framework and utilities layer 212 performs statistical and root-cause analysis on the operational data to obtain energy optimization data upon receiving a request from the energy efficiency management layer 208. Furthermore, the energy efficiency management layer 208 updates the energy management information using the energy optimization data. In addition, the energy transaction layer 206 generates the control commands using the processed data, the associated updated one or more pre-defined thresholds and set-points, and the energy management information.

Moreover, the energy transaction layer 206 substantially simultaneously manages energy of the multi customer distributed facilities using the generated control commands. For example, managing the energy includes event management, asset management, billing, invoicing and cost optimization management and the like. Also, the framework and utilities layer 212 intelligently reports performance, compliance and efficacy of the system to the multi customer distributed facilities by via the user interface layer 210.

In various embodiments, systems and methods described with reference to FIGS. 1 through 29 propose architecture for energy management of the multi customer multi time zone distributed facilities. The proposed architecture provides an intelligent and comprehensive energy management solution for optimization of energy consumption and control of complex aggregation of diverse devices in multi customer multi time zone distributed facilities. Thus achieving desired operating conditions within a given set of policies.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

APPENDIX A

| | |
|---|---|
| Detection of temperature profile violation (System Log) | Thu Sep 8 21:14:47 2011::Pointpath: C__ATLxL__102335xaSA__BTA02xTS__19xaP__TMP Current sensor Value: 28.92<br>Thu Sep 8 21:14:47 2011::Associated SCA ID: C__ATLxL__102335xSA__BTA02 with SCA High Threshold: 28.00<br>Thu Sep 8 21:14:47 2011:: C__ATLxL__102335xSA__BTA02: High Threshold exceeded.<br>Thu Sep 8 21:14:47 2011:: C__ATLxL__102335xSA__BTA02: |

| | -continued |
|---|---|
| | Temperature deviation event raised.<br>Thu Sep 8 21:14:47 2011:: C__ATLxL__102335xSA__BTA02:<br>GenerateTrap for Temperature Deviation<br>Thu Sep 8 21:14:47 2011:::Exiting from Function GenerateTrap |
| SCA Set point adjustment Control back in response (System Log) | Thu Sep 8 21:14:47 2011:: C__ATLxL__102335xSA__BTA02:<br>Pointpath: C__ATLxL__102335xaSA__BTA02xaP__TSP current value 25.5<br>Thu Sep 8 21:14:47 2011:: C__ATLxL__102335xSA__BTA02:<br>Pointpath: C__ATLxL__102335xaSA__BTA02xaP__TSP to be adjusted to 24.5<br>Thu Sep 8 21:14:47 2011::writeback to oid<br>1.3.6.1.4.1.4131.1.6.1.2.1.3.22 corresponding to<br>C__ATLxL__102335xaSA__BTA02xaP__TSP to 24.5 |
| Control back to Increase number of running operating assets in SCA in response: Thermal control (System Log) | Thu Sep 8 21:14:47 2011:: C__ATLxL__102335xSA__BTA02:<br>Number of Running assets is 2<br>Thu Sep 8 21:14:47 2011:: Increasing no of operating assets<br>Thu Sep 8 21:14:47 2011::writeback to oid<br>1.3.6.1.4.1.4131.1.6.1.2.1.3.25 corresponding to<br>C__ATLxL__102335xaSA__BTA02xaP__SPQTY to 3<br>Thu Sep 8 21:14:47 2011:: C__ATLxL__102335xSA__BTA02:<br>Number of Running assets is 3 |

What is claimed is:

1. A computer implemented method for energy management of multi customer distributed facilities located in different time zones, comprising:

forming, by an energy management computing device, energy models on each of the multi customer distributed facilities based on characteristics associated with at least devices, customers, energy sources, and regulatory policies at each of the multi customer distributed facilities;

obtaining, by the energy management computing device, data associated with energy management of the multi customer distributed facilities located in different time zones based on the associated energy models, the obtained data comprising thermal sensor data, asset status data, and automated meter data from each of the multi customer distributed facilities, wherein the thermal sensor data of at least one of the multi customer distributed facilities includes time series temperature data from one or more sensors of the at least one of the multi customer distributed facilities;

transforming, by the energy management computing device, the obtained data for energy management of the multi customer distributed facilities by mediating at least a portion of the obtained data to convert format and naming from one protocol to another uniform protocol;

validating, by the energy management computing device, the transformed data based on geographic region and customer characteristics;

performing thermal profiling, by the energy management computing device, by at least:

segregating and relating the time series temperature data and the asset status data of the transformed and validated data based on a service model and on time zone information about the different time zones in which the multi customer distributed facilities are located to derive temporal and spatial thermal characteristics for each of the multi customer distributed facilities located in the different time zones; and generating a combined temporal and spatial thermal profile for the multi customer distributed facilities based on a distribution of the derived temporal and spatial thermal characteristics of each of the multi customer distributed facilities located in the different time zones;

performing, by the energy management computing device, a statistical analysis and a root-cause analysis based on the derived temporal and spatial thermal characteristics for each of the multi customer distributed facilities and one or more predefined thresholds or set points;

generating, by the energy management computing device, one or more control commands to optimize energy consumption based on the statistical analysis and the root-cause analysis; and managing, by the energy management computing device, the energy consumption of the multi customer distributed facilities using the generated control commands.

2. The computer implemented method of claim 1, wherein the obtained data associated with the energy management of the multi customer distributed facilities further comprises emissions data, digital invoice data, enterprise resource planning (ERP) data, weather data, emergency alert data and/or service desk data.

3. The computer implemented method of claim 1, wherein the transforming the obtained data for energy management of the multi customer distributed facilities further comprises:

normalizing, by the energy management computing device, the transformed data.

4. The computer implemented method of claim 1, wherein the characteristics for customers further comprise one or more of characteristics for customer needs or customer policies.

5. The computer implemented method of claim 4, further comprising:

obtaining, by the energy management computing device, the customer policies and regulatory policies.

6. The computer implemented method of claim 5, wherein the generating the control commands using the transformed data and associated one or more pre-defined thresholds and set-points further comprises:

generating, by the energy management computing device, control commands based on the transformed data and one or more pre-defined thresholds and set-points dynamically updated based on the obtained data.

7. The computer implemented method of claim 6, further comprising:

dynamically updating, by the energy management computing device, the one or more predefined thresholds and set-points based on operational data.

8. The computer implemented method of claim 6, further comprising:
updating, by the energy management computing device, the one or more predefined thresholds and set-points based on an energy knowledge base.

9. The computer implemented method of claim 1, wherein the control commands comprise thermal control, consumption control, operational modes control, utilization control, demand control, eco-mode control, energy source control, carbon emission control, and/or performance monitoring control.

10. The computer implemented method of claim 1, wherein the managing the energy further comprises event management, asset management and/or invoicing and cost optimization management.

11. The computer implemented method of claim 1, further comprising:
processing, by the energy management computing device, data to obtain energy efficiency improvement features selected from the group consisting of consumption profiling by an operation mode, normalization of data obtained from multiple time zones, consumption data profiling by service type using virtual meters and model information and estimation techniques for missing consumption information, eco-mode profiling, savings estimation, asset utilization and capacity profiling, correlated validation, correlated data, device characteristic validation, industry, past performance, climate, policies, load conditions, and service for validation, device, area and service chain based event /ticket enrichment of dependent devices, services, and areas.

12. An energy management system (EMS) for energy management of multi customer distributed facilities located in different time zones, comprising:
a processor;
memory with an energy management engine and coupled to the processor which are configured to execute programmed instructions stored in the memory comprising:
forming energy models on each of the multi customer distributed facilities based on characteristics associated with each of devices, customers, energy sources, and regulatory policies at each of the multi customer distributed facilities;
obtaining data associated with energy management of the multi customer distributed facilities based on the associated energy models, the obtained data comprising thermal sensor data, asset status data, and automated meter data from each of the multi customer distributed facilities, wherein the thermal sensor data of at least one of the multi customer distributed facilities includes time series temperature data from one or more sensors of the at least one of the multi customer distributed facilities;
transforming the obtained data for energy management of the multi customer distributed facilities by mediating at least a portion of the obtained data to convert format and naming from one protocol to another uniform protocol;
validating the transformed data based on geographic region and customer characteristics;
performing thermal profiling by at least:
segregating and relating the time series temperature data and the asset status data of the transformed and validated data based on a service model and on time zone information about the different time zones in which the multi customer distributed facilities are located to derive temporal and spatial thermal characteristics for each of the multi customer distributed facilities located in the different time zones; and
generating a combined temporal and spatial thermal profile for the multi customer distributed facilities based on a distribution of the derived temporal and spatial thermal characteristics of each of the multi customer distributed facilities located in the different time zones
performing a statistical analysis and a root-cause analysis based on the derived temporal and spatial thermal characteristics for each of the multi customer distributed facilities and one or more predefined thresholds or set points;
generating one or more control commands to optimize energy consumption based on the statistical analysis and the root-cause analysis; and
managing the energy consumption of the multi customer distributed facilities using the generated control commands.

13. The EMS of claim 12, wherein the obtained data associated with the energy management of the multi customer distributed facilities comprises emissions data, digital invoice data, enterprise resource planning (ERP) data, weather data, emergency alert data and/or service desk data.

14. The EMS of claim 12, normalizing the transformed data.

15. The EMS of claim 12, wherein the characteristics for customers further comprise one or more of customer needs or customer policies.

16. The EMS of claim 15 further comprising:
reporting performance, compliance and efficacy of the EMS for the multi customer distributed facilities.

17. The EMS of claim 15, further comprising obtaining the customer policies and regulatory policies.

18. The EMS of claim 16, further comprising:
dynamically updating the one or more predefined thresholds and set-points based on the obtained data.

19. The EMS of claim 16, further comprising:
updating the one or more predefined thresholds and set-points based on an energy knowledge base.

20. The EMS of claim 16, further comprising: generating control commands based on the transformed data and associated updated one or more pre-defined thresholds and set-points and dynamic decisions.

21. The EMS of claim 12, wherein the control commands comprise thermal control, consumption control, operational modes control, utilization control, demand control, eco-mode control, energy source control, carbon emission control, and/or performance monitoring control.

22. The EMS of claim 12, wherein the managing the energy comprises event management, asset management and/or billing, invoicing and cost optimization management.

23. The EMS of claim 12, further comprising:
processing data to obtain energy efficiency improvement features selected from the group consisting of consumption profiling by an operation mode, normalization of data obtained from multiple time zones, consumption data profiling by service type using virtual meters and model information and estimation techniques for missing consumption information, eco-mode profiling, savings estimation, asset utilization and capacity profiling, correlated validation, correlated data, device characteristic validation, industry, past performance, climate, policies, load conditions, and service for validation, device, area and service chain based event /ticket enrichment of dependent devices, services, and areas.

24. At least one non-transitory computer-readable storage medium for energy management of multi customer distributed facilities located in different time zones, when executed by a computing device, cause the computing device to:

form energy models on each of the multi customer distributed facilities based on characteristics associated with each of devices, customers, energy sources, and regulatory policies at each of the multi customer distributed facilities;

obtain data associated with energy management of the multi customer distributed facilities located in different time zones based on the associated energy models, the obtained data comprising thermal sensor data, asset status data, and automated meter data from each of the multi customer distributed facilities, wherein the thermal sensor data of at least one of the multi customer distributed facilities includes time series temperature data from one or more sensors of the at least one of the multi customer distributed facilities;

transform the obtained data for energy management of the multi customer distributed facilities by mediating at least a portion of the obtained data to convert format and naming from one protocol to another uniform protocol;

validate the transformed data based on geographic region and customer characteristics;

perform thermal profiling by at least:

segregating and relating the time series temperature data and the asset status data of the transformed and validated data based on service model and on time zone information about the different time zones in which the multi customer distributed facilities are located to derive temporal and spatial thermal characteristics for each of the multi customer distributed facilities located in the different time zones; and generating a combined temporal and spatial thermal profile for the multi customer distributed facilities based on a distribution of the derived temporal and spatial thermal characteristics of each of the multi customer distributed facilities located in the different time zones;

perform a statistical analysis and a root-cause analysis based on the derived temporal and spatial thermal characteristics for each of the multi customer distributed facilities and one or more predefined thresholds or set points;

generate one or more control commands to optimize energy consumption based on the statistical analysis and the root-cause analysis; and manage the energy consumption of the multi customer distributed facilities using the generated control commands.

25. The non-transitory computer-readable storage medium as set forth in claim 24 wherein the generate control commands further comprises generate control commands based on the transformed data and one or more pre-defined thresholds and set points dynamically updated based on the obtained data.

* * * * *